(12) United States Patent
Zhang et al.

(10) Patent No.: US 8,726,315 B2
(45) Date of Patent: May 13, 2014

(54) METHOD AND SERVER SIDE AND TERMINAL FOR FINDING INTERACTIVE ELECTRIC SERVICE GUIDE

(75) Inventors: Chuxiong Zhang, Shenzhen (CN); Teng Shi, Shenzhen (CN); Jie Zhang, Shenzhen (CN); Yuanyuan Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1242 days.

(21) Appl. No.: 12/403,843

(22) Filed: Mar. 13, 2009

(65) Prior Publication Data

US 2009/0178082 A1    Jul. 9, 2009

Related U.S. Application Data

(63) Continuation of application No. PCT/CN2007/070337, filed on Jul. 20, 2007.

(30) Foreign Application Priority Data

Sep. 15, 2006   (CN) .......................... 2006 1 0154178
Apr. 19, 2007   (CN) .......................... 2007 1 0096937
Jun. 23, 2007   (CN) .......................... 2007 1 0126558

(51) Int. Cl.
*H04N 7/025*      (2006.01)
*H04N 7/10*       (2006.01)
*H04N 7/173*      (2011.01)
*H04N 5/445*      (2011.01)
*H04W 4/00*       (2009.01)
*H04N 21/00*      (2011.01)
*H04N 21/61*      (2011.01)

(52) U.S. Cl.
CPC ........... *H04N 21/00* (2013.01); *H04N 21/6125* (2013.01)

USPC ................... 725/51; 725/34; 725/37; 725/54; 725/110; 455/432.1

(58) Field of Classification Search
CPC ... H04N 21/00; H04N 21/6125; H04N 21/41; H04H 2201/16; H04H 60/85
See application file for complete search history.

(56) References Cited

U.S. PATENT DOCUMENTS

2005/0090235 A1   4/2005   Vermola et al.
2006/0019618 A1   1/2006   Seppala
(Continued)

FOREIGN PATENT DOCUMENTS

CN      1540988       10/2004
CN      1558676       12/2004
(Continued)

OTHER PUBLICATIONS

Digital Video Broadcasting, DVB, "IP Datacast over DVB-H: Architecture", DVB Document A098, Nov. 2005.*

(Continued)

*Primary Examiner* — Nathan Flynn
*Assistant Examiner* — James R Marandi

(57) ABSTRACT

A method and a service side and a terminal for finding an interactive electronic service guide. Said method comprises: the server side down-issuing the information corresponding to the finding interactive ESG service to the terminal through the broadcast channel, and the terminal acquires the information for finding the interactive ESG service in the broadcast channel. Said server side comprises a sending module of the related information for finding interactive ESG service and a down-issue module for the ESG supplier list. The terminal comprises a receiving module of the related information for finding the interactive ESG service and a receiving module for the ESG supplier list.

5 Claims, 15 Drawing Sheets

(56) References Cited

U.S. PATENT DOCUMENTS

| | | | |
|---|---|---|---|
| 2007/0107013 A1* | 5/2007 | Seppala et al. | 725/39 |
| 2008/0184306 A1 | 7/2008 | Ellis et al. | |
| 2008/0201746 A1* | 8/2008 | Xu et al. | 725/54 |

FOREIGN PATENT DOCUMENTS

| | | |
|---|---|---|
| CN | 101175245 B | 8/2010 |
| CN | 101175245 B | 8/2011 |
| GB | 2407242 A | 4/2005 |
| GB | 2407738 A | 5/2005 |
| WO | WO 2006036276 A1 | 4/2006 |
| WO | WO2006036276 A1 | 4/2006 |

OTHER PUBLICATIONS

"Digital Video Broadcasting (DVB); IP Datacast over DVB-H: Electronic Service Guide (ESG) European Broadcasting Union Union Europeenne de Radio Television EBUUER; ETSI TS 102 471" ETSI Standards, LIS, Sophia Antipolis Cedex, France, vol. BC, No. V1.1.1, Apr. 1, 2006, XP014033898 ISSN: 0000-0001.

Copy of Written Opinion of the International Searching Authority issued in corresponding PCT Patent Application No. PCT/CN2007/070337, mailed Oct. 25, 2007.

Copy of Office Action issued in corresponding Chinese Patent Application No. 2007101265584, mailed Dec. 4, 2009.

Open Mobile Alliance, "Service Guide for Mobile Broadcast Services" OMA-TS-BCAST_Service_Guide-V1_0_1-20100526-D, Draft Version 1.0.1—May 26, 2010.

Open Mobile Alliance, "Service Guide for Mobile Broadcast Services" OMA-TS-BCAST_Service_Guide-V1_0_1-20100526-D, Draft Version 1.0.1—May 26, 2010, with markups.

Booth et al., "Web Services Description Language (WSDL) Version 2.0 Part 0: Primer", W3C Recommendation, Jun. 26, 2007.

Mitra et al., "SOAP Version 1.2 Part 0: Primer" (Second Edition), W3C Recommendation, Apr. 27, 2007.

Office action issued in corresponding Chinese patent application No. 201010252020.X, dated Apr. 17, 2012, and English translation thereof, 11 pages total.

ETSI TS 102 471 V1.1.1: "Digital Video Broadcasting (DVB); IP Datacast over DVB-H: Electronic Service Guide (ESG)", Apr. 2006, total 79 pages.

Second office action issued in corresponding European patent application No. 07764264.3, Dec. 11, 2012, total 5 pages.

* cited by examiner

METHOD AND SERVER SIDE AND TERMINAL FOR FINDING INTERACTIVE ELECTRIC SERVICE GUIDE

The present application is a continuation of International Application No. PCT/CN2007/070337, filed on Jul. 20, 2007, which claims priority to Chinese Patent Application Nos. 200610154178.7, filed on Sep. 15, 2006; 200710096937.3, filed on Apr. 19, 2007 and 200710126558.4, filed on Jun. 23, 2007; all of which are hereby incorporated by reference in their entireties.

FIELD OF THE INVENTION

The present invention relates to application layer technologies of mobile communications, and in particular to a method, a server and a terminal for discovering an interactive Electronic Service Guide (ESG).

BACKGROUND OF THE INVENTION

Electronic Service Guide (ESG) is one of important aspects in application layer technologies of mobile communications. A terminal user may use the ESG to view conveniently various service materials, to browse a video channel, a program schedule, a price table, to select and purchase an item in the price table, and to link to an external web page to browse related information, etc.

At present, there are two methods with respect to ESG, one is a broadcast ESG and the other is an interactive ESG. In the broadcast ESG, a terminal is initialized through a bootstrap session of the broadcast ESG, reads a list of ESG providers from ESG discovery information and displays it to the terminal user. After the terminal user selects an ESG provider, the terminal is tuned to a specific session in accordance with ESG access information in the ESG bootstrap session and receives ESG data of the ESG provider selected by the terminal user, as illustrated in FIG. 1.

In the interactive ESG in the prior art, a terminal user may submit an enquiry request and user profile, etc., to a server, and this may bring abundant ESG functions.

The interactive ESG may be implemented with a Web Service. The Web Service is a new branch of web page application programs, and it may provide summarily the functions over the Internet and an enterprise intranet by means of standard Internet protocols, e.g., the HyperText Transfer Protocol (HTTP) and the eXtensible Markup Language (XML). The Web Service may be regarded as component programming on a web page. The Web Service is an independent and modular application and it may be described, published, located and invoked over the Internet. The architecture of the Web Service includes three parts: a service provider, a service requester and a service registry. There are primarily three operations, i.e., Publish, Find and Bind, presented between the respective parts.

The Web Service per se is provided with a perfect discovery mechanism. The existing standard of Universal Description, Discovery and Integration (UDDI) defines a method for discovering and using a Web Service in the case of an unknown Web Service location. The UDDI may enable an application program to discover and contact a server providing a given Web Service. After an interactive channel is introduced between a terminal and a server, the terminal may submit an enquiry request to the UDDI server via the interactive channel and obtain Web Service invocation information of a specific ESG provider, and thereafter the terminal may invoke the specific Web Service according to the obtained information.

FIG. 2 is a flow chart of discovering an interactive ESG service in the prior art. This flow includes the following steps.

In step 201, a terminal submits an interactive ESG enquiry request to a UDDI server.

In step 202, the UDDI server processes the received interactive ESG enquiry request and obtains from its stored information the Web Service invocation information satisfying the interactive ESG enquiry request.

In step 203, the UDDI server returns to the terminal the Web Service invocation information of the interactive ESG.

In step 204, the terminal parses the received Web Service invocation information of the interactive ESG and determines a format to submit a data request to an interactive ESG provider.

In step 205, the terminal submits the data request in the determined format to the interactive ESG provider.

In step 206, the interactive ESG provider processes the data request of the terminal and obtains from its stored information the ESG data satisfying the request of the terminal.

In step 207, the interactive ESG provider returns to the terminal the ESG data complying with the request of the terminal.

This solution is disadvantageous in that bandwidth consumption is not stable and the load of the interactive channel will be increased in the case that a plurality of terminals requests concurrently the server in the interactive channel for discovering an interactive ESG service. In addition, since a plurality of terminals request concurrently the UDDI server for enquiring the interactive ESG, load of the UDDI server will be too heavy.

Further, different terminals have to download the same information respectively from the same interactive ESG provider to discover this interactive ESG provider, which may consequently lower the efficiency of using the interactive channel.

In the prior art, another technology to obtain Web Service invocation information is a Web Service inspection (WS-inspection) technology. The WS-inspection technology provides Web Service related information in a totally distributed mode. The WS-inspection technology integrates descriptions of different types of ESG services in a WS-inspection document, and when a terminal needs to discover an interactive ESG service, the terminal sends a request for obtaining Web Service invocation information directly to a service delivery point where the WS-inspection document is stored; and the service delivery point searches in its stored WS-inspection document according to the received enquiry request, and use an existing standard to return the Web Service invocation information to the terminal in accordance with a WS-inspection specification. The adoptable existing standard may be the Web Service Description Language (WSDL), etc., and thus the terminal may make direct use of the obtained Web Service invocation information without any modification. In the prior art, the XML format is used for the WS-inspection document.

In this method of obtaining Web Service invocation information through a WS-inspection, related information has to be downloaded from a known service delivery point address via an interactive channel, which may consequently increase the load of the interactive channel and lower the efficiency of using the interactive channel.

In summary, the solutions of discovering an interactive ESG in the prior art require interaction between a terminal and a server to obtain Web Service invocation information, which may result in an increased load of an interactive channel and a lowered efficiency of using the interactive channel.

SUMMARY OF THE INVENTION

Accordingly, an embodiment of the present invention provides a method, a server and a terminal for discovering an interactive ESG, which may reduce the load of an interactive channel and improve the efficiency of using the interactive channel.

An embodiment of the invention provides a method for discovering an interactive ESG, including:

issuing, by a server, information of ESG providers which is related to discovering of an interactive ESG service, to a terminal via a broadcast channel; and obtaining, by the terminal, the information of the ESG providers which is related to discovering of the interactive ESG service, from the broadcast channel.

An embodiment of the invention provides a server, including a module for sending information related to discovering of interactive ESG service and a module for issuing a list of ESG providers, wherein:

the module for sending information related to discovering of interactive ESG service is adapted to issue information of ESG providers which is related to discovering of the interactive ESG service to a terminal via a broadcast channel; and the module for issuing a list of ESG providers is adapted to issue a list of ESG providers to the terminal in an ESG bootstrap session via the broadcast channel.

An embodiment of the invention provides a terminal, including a module for receiving information related to discovering of interactive ESG service and a module for receiving a list of ESG providers, wherein:

the module for receiving a list of ESG providers is adapted to obtain a list of ESG providers from a broadcast channel, to display the list to a user and to record an ESG provider selected by the user; and the module for receiving information related to discovering of interactive ESG service is adapted to obtain corresponding information related to discovering of the interactive ESG service from the broadcast channel according to the ESG provider selected by the user As can be seen from the solutions of the invention, a method, a server and a terminal for discovering an interactive ESG are provide according to the embodiments of the invention, in which the server issues the information related to discovering of an interactive ESG service to the terminal via a broadcast channel, and the terminal obtains the information for discovering the interactive ESG service from the broadcast channel, so that it is unnecessary for the terminal to submit an enquiry request to an interactive ESG service enquiry server, e.g., a UDDI server, thereby reducing the load of an interactive channel and improving the efficiency of using the interactive channel.

DETAILED DESCRIPTION OF THE EMBODIMENTS

Embodiments of the present invention will be further described in detail hereinafter with reference to the drawings to make the objects, solutions and advantageous effects thereof more apparent.

In the solutions for discovering an interactive ESG service according to the embodiments of the invention, a server issues information of ESG providers which is related to discovering of an interactive ESG service to a terminal via a broadcast channel, and the terminal obtains the information of the ESG providers which is related to discovering of the interactive ESG service from the broadcast channel.

The embodiments of the invention provide six solutions of discovering an interactive ESG service, where the information related to discovering of the interactive ESG service in the first, second and fourth solutions is Web Service invocation information of the interactive ESG; the information related to discovering of the interactive ESG service in the third solution is entrance information of the interactive ESG; the information related to discovering of the interactive ESG service in the fifth solution is entrance information of a transport session of Web Service invocation information of the interactive ESG at the server; and the information related to discovering of the interactive ESG service in the sixth solution is an address for obtaining segmentation declaration information. The six solutions of discovering an interactive ESG service according to the embodiments of the invention will be described in detail below.

In the first solution of discovering an interactive ESG service according to an embodiment of the invention, a server extends the discovery information of each ESG provider by an identity which identifies the interactive ESG, and issues each piece of Web Service invocation information as a transport object to a terminal via a broadcast channel. After determining that a user has selected an interactive ESG service, the terminal obtains the Web Service invocation information of the corresponding interactive ESG from the broadcast channel.

Figure 1:
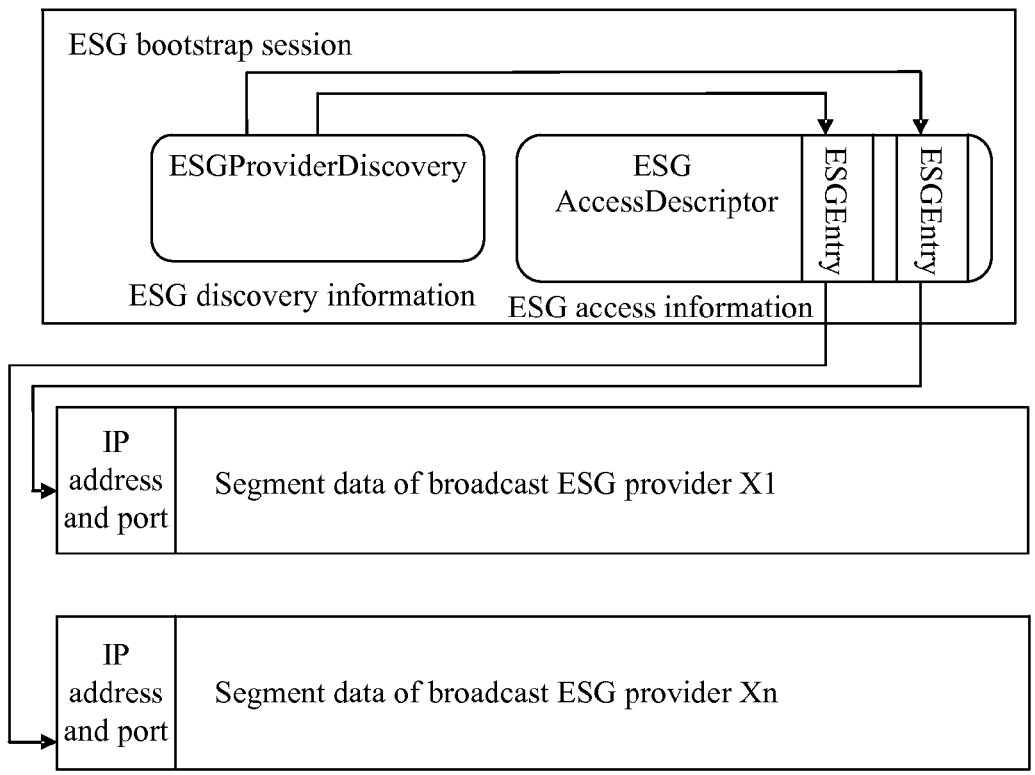
FIG. 1 is a schematic diagram of a bootstrap session of a broadcast ESG in the prior art.
Figure 2:
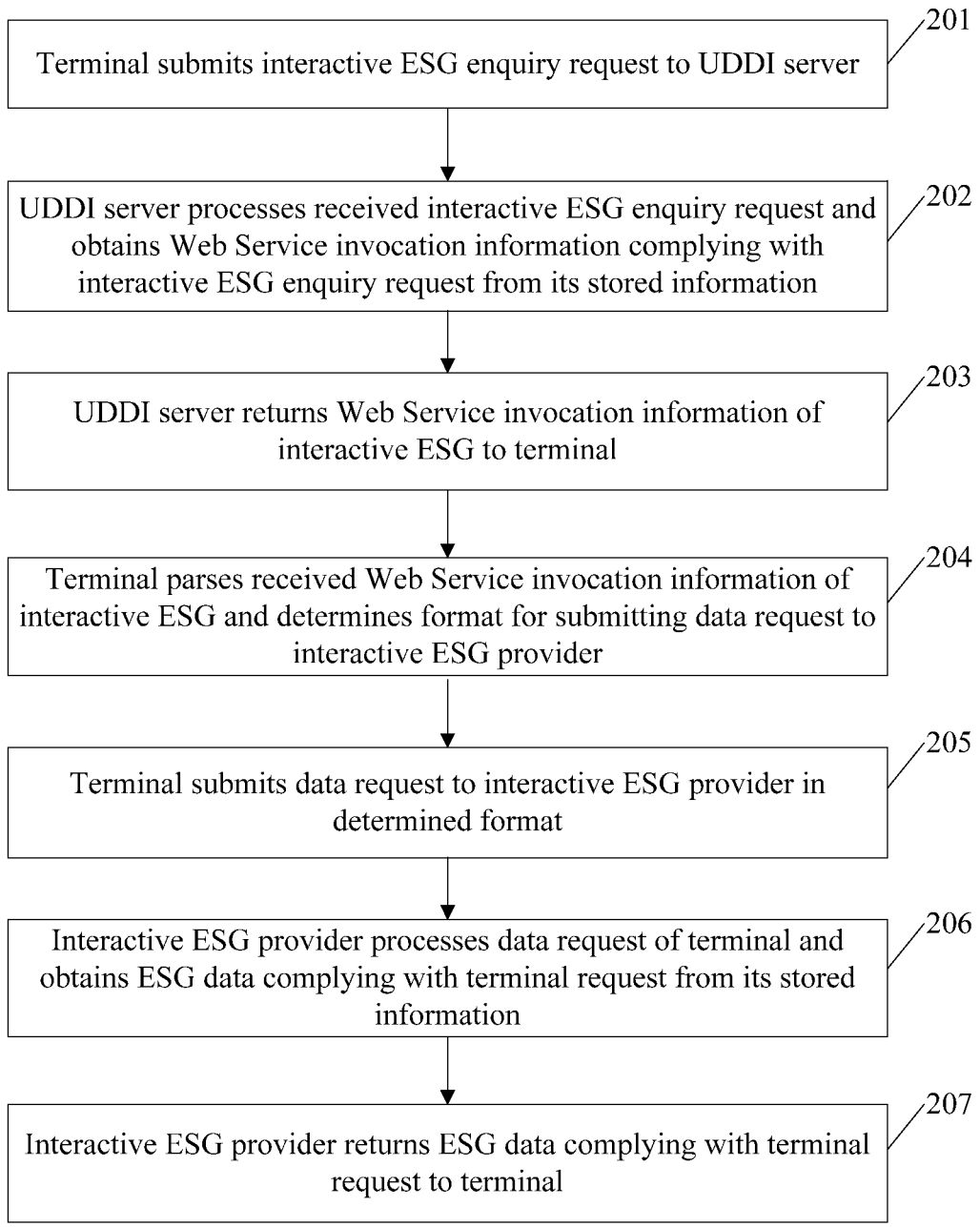
FIG. 2 is a flow chart of discovering an interactive ESG service in the prior art.
Figure 3:
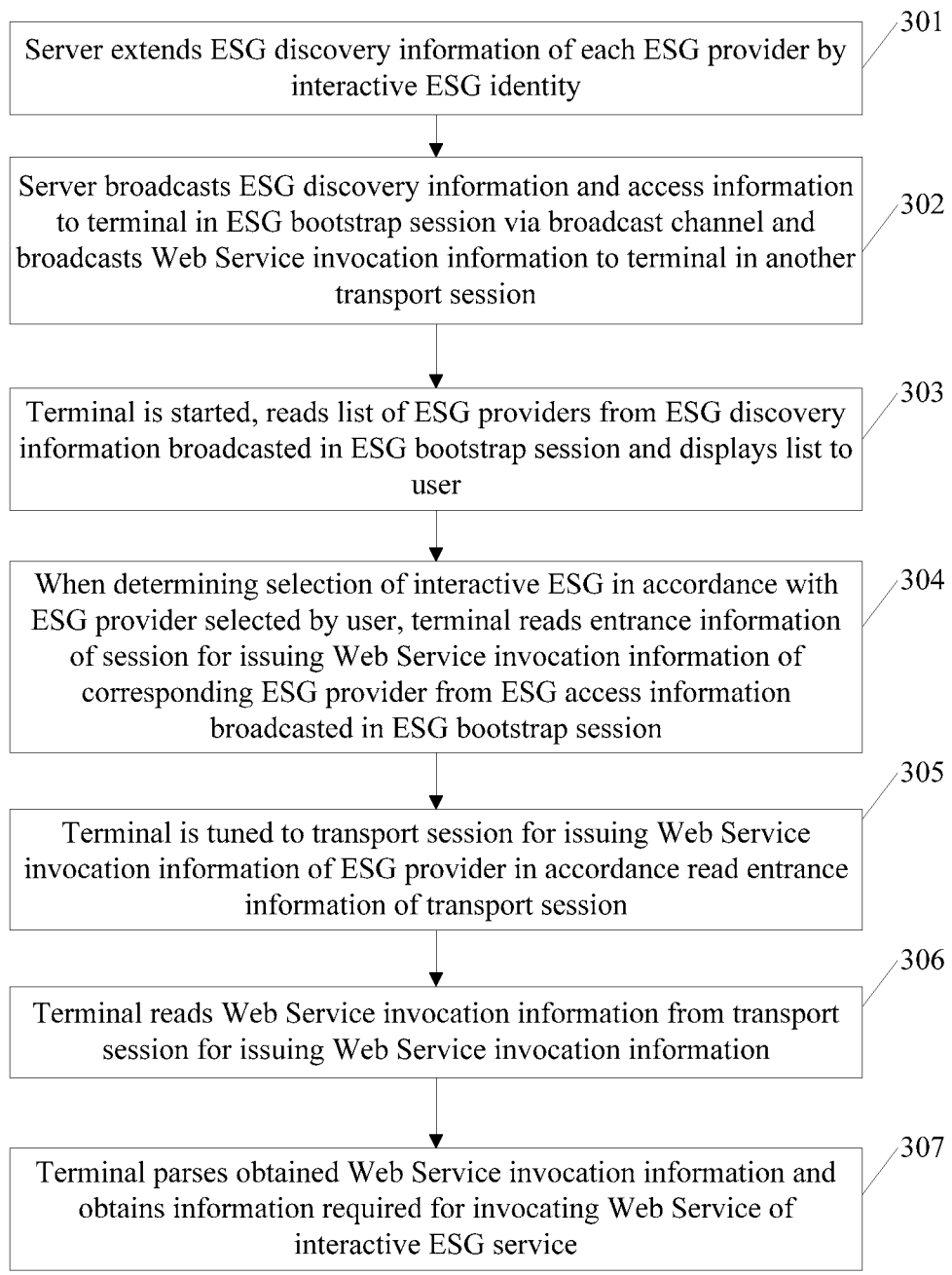
FIG. 3 is a flow chart of a method for discovering an interactive ESG service according to a preferred embodiment of the invention.

FIG. 3 is a flow chart of a method for discovering an interactive ESG service according to a preferred embodiment of the invention, and this flow includes the following steps.

In step 301, a server extends the ESG discovery information of each ESG provider by an interactive ESG identity.

The ESG discovery information in the server includes discovery information of a plurality of ESG providers, and the ESG discovery information of each ESG provider includes: a name of the ESG provider, an ID of the ESG provider (Provider ID) and other auxiliary information of the ESG provider.

If an ESG provider supports only an interactive ESG service or a broadcast ESG service, the server may extend the discovery information of the ESG provider by an interactive ESG identity which identifies the interactive or broadcast ESG.

Access information of each ESG provider of the server includes a Provider ID associated with the ESG discovery information, an IP address and a port for issuing ESG data, a transport session identity, etc.

If an ESG provider supports both an interactive ESG and a broadcast ESG, the server shall extend the ESG discovery information by an interactive ESG identity which identifies the corresponding interactive or broadcast ESG service and also extend the ESG access information by an identity of entrance information of the interactive ESG, which indicates the corresponding ESG transport session entrance information used in the interactive ESG or in the broadcast ESG.

In step 302, the server broadcasts the ESG discovery information and the ESG access information to the terminal in an ESG bootstrap session via the broadcast channel and also broadcasts the Web Service invocation information corresponding to each interactive ESG service to the terminal in another transport session.

Protocols of FLUTE or the like may be used as a transport protocol for the transport session. Each piece of Web Service invocation information is broadcasted as a transport object to the terminal via the transport session, and one or more transport objects may be sent in a transport session.

If the server broadcasts the Web Service invocation information corresponding to a plurality of ESG services to the terminal via a transport session, the terminal may not determine which transport object is the required Web Service invocation information based on only the entrance information of the transport session.

In order to enable the terminal to obtain rapidly and determinately the required Web Service invocation information in the transport session for issuing the interactive Web Service invocation information, the server may generate in advance index information of the Web Service invocation information and broadcast the index information as a separate transport object along with the Web Service invocation information in the same transport session to the terminal.

The index information includes at least the following information: an ID of the interactive ESG provider (Provider ID) and a transport object ID which identifies a transport object for transport of a whole piece of Web Service invocation information.

At the same time, the server is required to indicate in the transport session for sending the Web Service invocation information that the index information or the Web Service invocation information is carried in the transport object. Thus before receiving the required Web Service invocation information, the terminal determines the transport object carrying the index information according to an index information identity, reads the index information from the transport object and reads the required Web Service invocation information from the corresponding transport object according to the ID of the transport object carrying the required Web Service invocation information, which is read from the index information. The invocation information as mentioned in this context refers to the Web Service invocation information.

The terminal may obtain rapidly the Web Service invocation information by means of the index information because the index information is typically of a relatively small size, just hundreds of bytes and therefore a cycle in which the server carousels the index information to the terminal in the broadcast channel is shorter than a cycle in which it broadcasts in turn the Web Service invocation information, so that the terminal may obtain rapidly and accurately the required Web Service invocation information via the broadcast channel in accordance with the information carried in the index information.

Preferably, the Web Service invocation information is described with the WSDL standard, that is, the Web Service invocation information is stored in a WSDL file.

In step 303, the terminal is started, reads a list of ESG providers from the ESG discovery information broadcasted in the ESG bootstrap session and displays the list to the user.

In step 304, when determining selection of the interactive ESG according to an ESG provider selected by the user, the terminal reads, from the ESG access information broadcasted in the ESG bootstrap session, the entrance information of the session for issuing the Web Service invocation information of the corresponding ESG provider.

This step includes the following procedure. The terminal records the ID of the ESG provider selected by the user, and if it is determined that the ESG provider may support the interactive ESG and the terminal determines selection of the interactive ESG, the terminal obtains entrance information of a transport session for issuing the Web Service invocation information from the ESG access information according to the recorded provider ID.

Here, the terminal may determine, according to the interactive ESG identity in the ESG discovery information corresponding to the recorded ID of the ESG provider, whether the ESG provider may provide the interactive ESG, and if the ESG provider may provide the interactive ESG, the terminal may determine selection of the interactive ESG service or a broadcast ESG service according to whether an interactive channel service has been enabled, or whether an interactive channel signal is strong or weak, etc.

In step 305, the terminal is tuned to the transport session for issuing the Web Service invocation information of the ESG provider according to the read entrance information of the transport session.

In step 306, the terminal reads the Web Service invocation information in the transport session for issuing the Web Service invocation information.

If only one transport object carrying the Web Service invocation information is transported in the transport session, the terminal may obtain the Web Service invocation information directly from this transport session.

If a plurality of transport objects carrying the Web Service invocation information and transport objects carrying the index information are sent in the transport session, the terminal determines the transport object carrying the index information according to an index information identity, reads the index information from the transport object and reads the Web Service invocation information from the corresponding transport object according to the ID of the transport object carrying the required Web Service invocation information, which is read from the index information.

In step 307, the terminal parses the obtained Web Service invocation information and obtains the information required for invoking the Web Service of the interactive ESG service.

The above steps are for the purpose of discovering an ESG service. Upon obtaining the Web Service invocation information, the terminal executes the following steps to obtain required ESG data from the interactive ESG provider: the terminal submits a data request to the interactive ESG provider via an interactive channel; the interactive ESG provider processes the received data request and generates resultant data; and the interactive ESG provider returns the ESG data complying with the data request of the terminal via the interactive channel.

Figure 4:
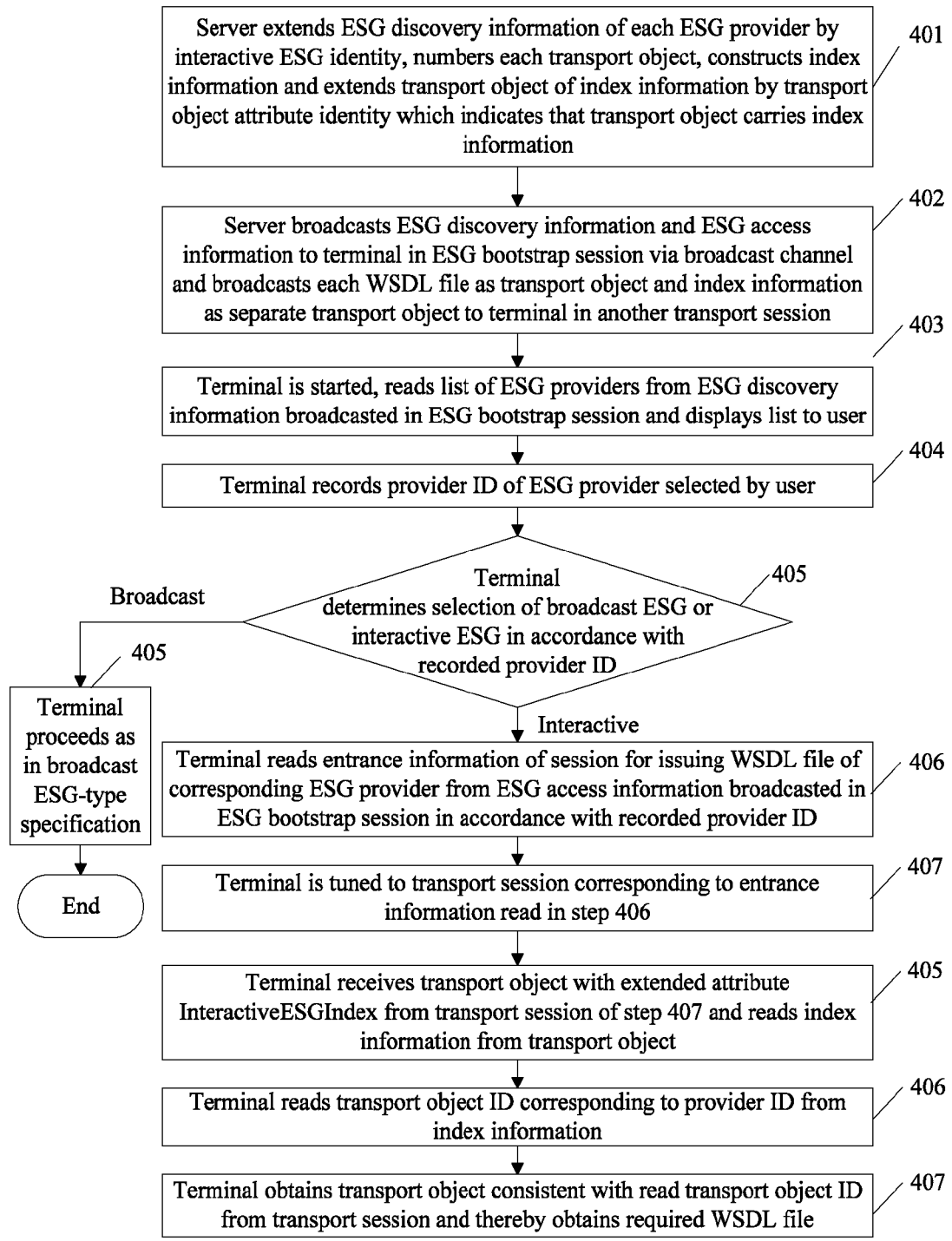
FIG. 4 is a flow chart of an implementation of the embodiment illustrated in FIG. 3.

FIG. 4 is a flow chart of an implementation of the embodiment illustrated in FIG. 3. In this implementation, it is assumed that the provider of the ESG service required from the terminal supports only an interactive ESG or a broadcast ESG and the server broadcasts a plurality of transport objects carrying the Web Service invocation information to the terminal in a transport session, and it is assumed that the Web Service invocation information is in a WSDL file and the transport session is a FLUTE session. This flow includes the following steps.

In step 401, the server extends the ESG discovery information of each ESG provider by an interactive ESG identity, numbers each WSDL file transport object, constructs index information of the transport object in a transport session and extends the transport object carrying the index information by a transport object attribute identity for indicating that the index information or a WSDL file is carried in the transport object.

In the prior art, ESG discovery information is carried in the descriptor ESGProviderDiscovery, and ESG access information is carried in the descriptor ESGAccessDescriptor.

In the descriptor ESGProviderDiscovery, each ESG provider is described with a service provider element, and the type of this element is ESGProviderType. In order to enable the terminal to determine an interactive or broadcast ESG service, this embodiment extends ESGProviderType by a field which indicates that the corresponding ESG service is interactive or broadcast and which is named by an InteractiveESG identity as illustrated in Table 1. The type E1 in Table 1 indicates that all elements in the table are first-layer elements of ESGProviderType.

TABLE 1

| Parameter | Type | Number of occurrences | Meaning | Data type |
|---|---|---|---|---|
| ProviderURI | E1 | 1 | Uniform Resource Identifier (URI) of ESG provider | Character string |
| ProviderName | E1 | 1 | Name of ESG provider | Character string |
| ProviderLogo | E1 | 0 . . . 1 | Logo information of ESG provider | Embedded binary file |
| ProviderID | E1 | 1 | ID of ESG provider | Positive integer |
| ProviderInformationURL | E1 | 0 . . . 1 | Link to other information of ESG provider | Character string |
| PrivateAuxiliaryData | E1 | 0 . . . 1 | Auxiliary data of provider | Character string |
| InteractiveESG | E1 | 1 | Determining whether it is flag bit of interactive ESG or not | Boolean type |

The server extends the discovery information of each ESG provider by an interactive ESG identity and may also use a bit in the ProviderID field of each ESG provider as an interactive ESG flag bit which indicates that the corresponding ESG service is interactive or broadcast.

A structure of index information of a WSDL file transport object sent in a transport session is as illustrated in Table 2. The index information includes: the number of WSDL files, the ID of the interactive ESG provider and the ID of each transport object. Data types of respective fields are unsigned integers and most significant bit first.

TABLE 2

| Syntax | Length of field (in bits) | Meaning |
|---|---|---|
| WSDL_index{ | | Index structure |
| num_of_WSDL | 8 | Number of WSDL files |
| for(i=0;i<num_of_WSDL;i++){ | | |
| providerID | 8 | ID of interactive ESG provider |
| TOI | 32 | Transport object ID |
| } | | |
| } | | |

In an FDT-Instance XML Schema of the FLUTE protocol, a root element FDT-Instance includes a plurality of File elements, each of which describes a transport object. Each File element includes an anyAttribute attribute which may be extended arbitrarily.

If a WSDL file is transported in a transport object, then the anyAttribute attribute of the File element describing this transport object is not extended; and if index information is transported in a transport object, then the anyAttribute attribute of the File element describing this transport object is extended.

For a transport object for transport of index information, the anyAttribute attribute of the corresponding File element is extended as InteractiveESGIndex=True.

Figure 5:
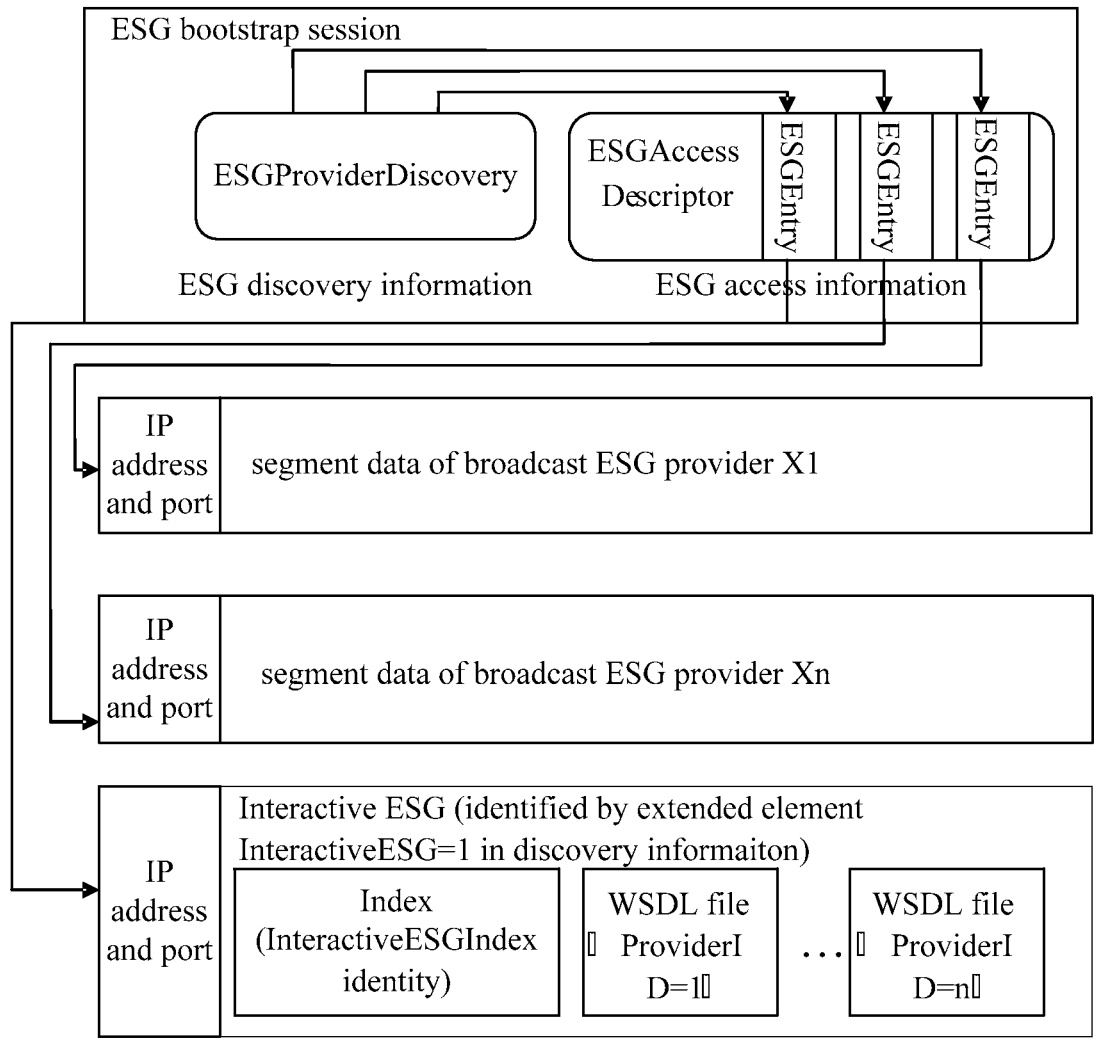
FIG. 5 is a schematic diagram of issuing a WSDL file to a terminal through a transport session in the way illustrated in FIG. 4.

FIG. 5 is a schematic diagram of issuing a WSDL file to the terminal through a transport session in the way illustrated in FIG. 4. As may be seen from the figure, index information is issued as a separate transport object to the terminal, and the transport object is identified with an extended FDT attribute InteractiveESGIndex.

In step 402, the server broadcasts the ESG discovery information and the ESG access information to the terminal in an ESG bootstrap session via the broadcast channel and also broadcasts each WSDL file as a transport object and the index information as a separate transport object to the terminal in another transport session.

In step 403, the terminal is started, reads a list of ESG providers from the ESG discovery information broadcasted in the ESG bootstrap session and displays the list to the user.

In step 404, the terminal records the provider ID of an ESG provider selected by the user.

In step 405, when determining selection of a broadcast ESG according to the recorded provider ID, the terminal proceeds as in a broadcast ESG-type specification and ends the flow; and when determining selection of the interactive ESG, the terminal executes step 406.

Here, the terminal may determine selection of a broadcast ESG or the interactive ESG according to the interactive ESG identity in the discovery information of the ESG provider.

In step 406, the terminal reads from the ESG access information broadcasted in the ESG bootstrap session according to the recorded provider ID the entrance information of the session for issuing the WSDL file of the corresponding ESG provider, including an IP address and a port number.

In step 407, the terminal is tuned to the transport session corresponding to the entrance information read in step 406.

In step 408, the terminal receives the transport object with the extended attribute InteractiveESGIndex from the transport session mentioned in step 407 and reads the index information from the transport object.

In step 409, the terminal reads from the index information the transport object ID corresponding to the provider ID.

In step 410, the terminal obtains the transport object consistent with the read transport object ID from the transport session and thereby obtains the required WSDL file.

Figure 6:
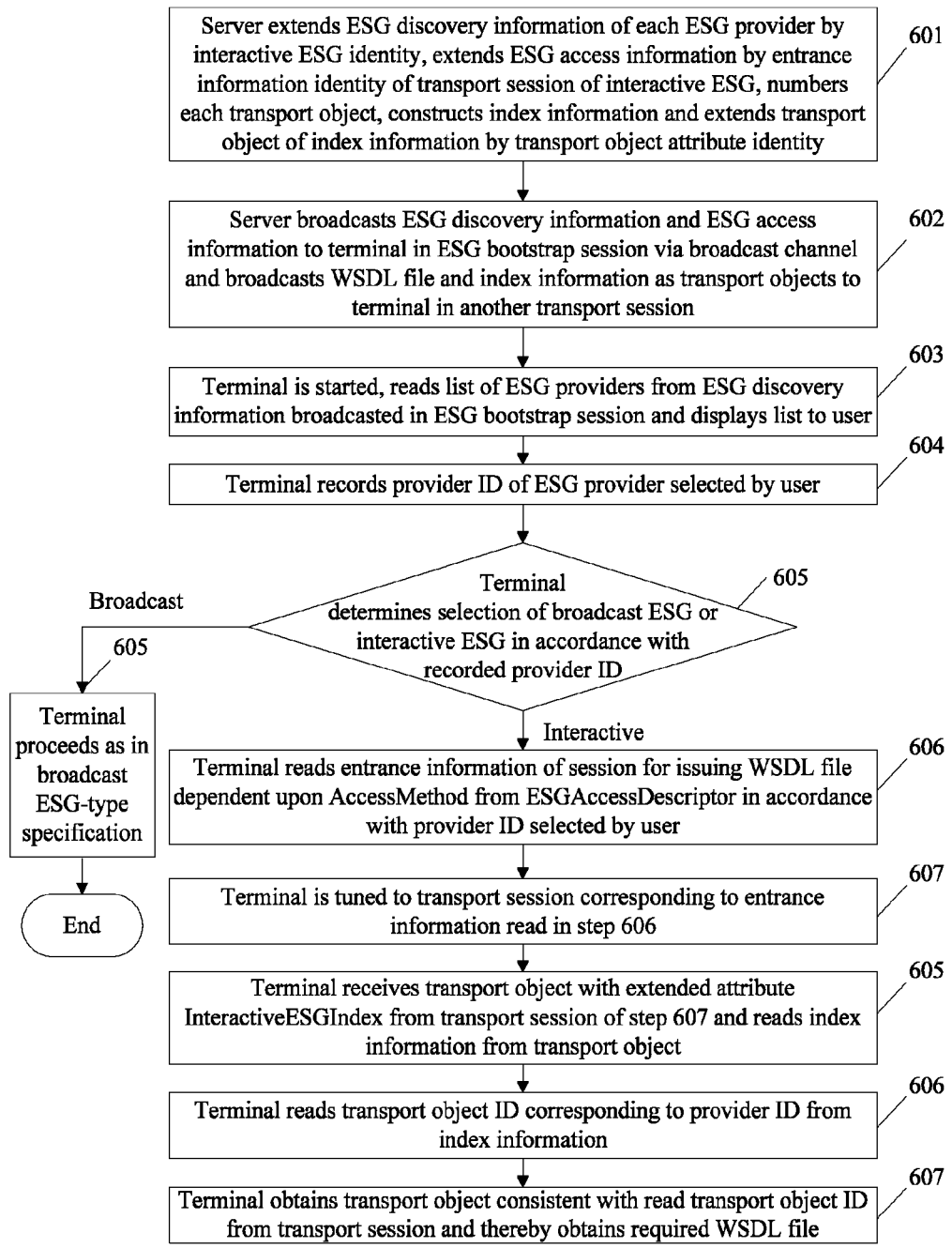
FIG. 6 is a flow chart of another implementation of the embodiment illustrated in FIG. 3.

FIG. 6 is a flow chart of another implementation of the embodiment illustrated in FIG. 3. In this implementation, it is assumed that the provider of the ESG service required for the terminal supports both an interactive ESG and a broadcast ESG and the server broadcasts a plurality of transport objects carrying the Web Service invocation information to the terminal in a transport session, and it is assumed that the Web Service invocation information is in a WSDL file and the transport session is a FLUTE session. This flow includes the following steps.

In step 601, the server extends the ESG discovery information of each ESG provider by an interactive ESG identity, extends the ESG access information by an entrance information identity of a transport session of the interactive ESG, constructs index information of a WSDL file transport object sent in a transport session and extends the transport object carrying the index information by a transport object attribute identity.

The server extends ESGProviderType by the interactive ESG identity as in Table 1, constructs the index information as in Table 2 and extends the transport object for transport of the index information by the anyAttribute attribute of a File element by means of the embodiment of the method shown in FIG. 4, i.e., InteractiveESGIndex=True.

This embodiment also extends ESGAccessDescriptor by an AccessMethod field which indicates whether the transport session entrance information in two pieces of access information with the same provider ID is used for an interactive or broadcast ESG. In this implementation, a bit in a reserved field is used as an AccessMethod flag bit and the reserved field is reduced from original 6 bits to 5 bits.

As illustrated in Table 3 and Table 4, Table 3 illustrates a structure of the ESGAccessDescriptor, and Table 4 illustrates ESGEntry extended with the AccessMethod field.

TABLE 3

| Syntax | Length of field (in bits) | Meaning |
|---|---|---|
| ESGAccessDescriptor{ n_o_ESGEntry  For(i=0; i<n_o_ESGEntry; i++){   ESGEntry [i]( )  } } | 16 | Number of ESGEntry |

TABLE 4

| Syntax | Length of field (in bits) | Meaning |
|---|---|---|
| ESGEntry{ | | |
| ESGEntryVersion | 8 | Version of ESGEntry |
| ESGEntryLength | 8+ | Length of ESGEntry |
| MultipleStreamTransport | 1 | Whether multiple stream is used or not; a value of the field is 0 for interactive ESG |
| IPVersion6 | 1 | IPv6 protocol used or not |
| AccessMethod | 1 | 0: Access information of broadcast ESG; 1: Access information of interactive ESG. A value of the field is consistent with that of interactive ESG identity in ESG discovery information |
| Reserved | 5 | Reserved field |
| ProviderID | 16 | Provider ID |
| If(IPVersion6){ | | |
| SourceIPAddress | 128 | Source IP address in IPv6 protocol |
| DestinationIPAddress | 128 | Destination IP address in IPv6 protocol |
| }else{ | | |
| SourceIPAddress | 32 | Source IP address in IPv4 protocol. |
| DestinationIPAddress | 32 | Destination IP address in IPv4 protocol |
| } | | |
| Port | 16 | Port number |
| TSI | 16 | Transport session identity |
| } | | |

In step 602, the server broadcasts the ESG discovery information and the ESG access information to the terminal in an ESG bootstrap session via the broadcast channel and also broadcasts each WSDL as a transport object and the index information as a separate transport object to the terminal in another transport session.

In step 603, the terminal is started, reads a list of ESG providers from the ESG discovery information broadcasted in the ESG bootstrap session and displays the list to the user.

In step 604, the terminal records the provider ID of an ESG provider selected by the user.

In step 605, when determining selection of a broadcast ESG according to the recorded provider ID, the terminal proceeds as in a broadcast-type specification and ends the flow; and when determining selection of the interactive ESG, the terminal executes step 606.

Here, the terminal may determine selection of the interactive ESG service or a broadcast ESG service according to whether an interactive channel service has been enabled, or whether an interactive channel signal is strong or weak, etc.

In step 606, the terminal reads, from the ESG access information, i.e., the ESGAccessDescriptor, broadcasted in the ESG bootstrap session dependent upon the AccessMethod, according to the provider ID of the ESG provider selected by the user, the entrance information of the session for issuing the WSDL file of the interactive ESG of the corresponding ESG provider, including an IP address and a port number.

In step 607, the terminal is tuned to this transport session.

In step 608, the terminal receives the transport object with the extended attribute InteractiveESGIndex from the transport session and reads the index information from the transport object.

In step 609, the terminal reads from the index information the transport object ID corresponding to the provider ID.

In step 610, the terminal obtains the transport object consistent with the read transport object ID from the transport session and thereby obtains the required WSDL file.

In the second solution of discovering an ESG service according to an embodiment of the invention, a Web Service invocation information file is encapsulated in a container, and the container is broadcasted as a transport object to a terminal via a broadcast channel. One or more sub-structures may be encapsulated in a container and a Web Service invocation information file or an index information file is encapsulated in a sub-structure.

If only one sub-structure, i.e., only one Web Service invocation information file is encapsulated in a container, and only one container is transported in a transport session, then it is not necessary to construct an index file. If a plurality of sub-structures are encapsulated in a container or/and a plurality of containers are sent in a transport session, then it is necessary to construct an index information file, and a Web Service invocation information file or an index information file is encapsulated in a sub-structure. In a transport session, each container is identified with a unique container ID, and each sub-structure in a container is identified with a unique sub-structure ID.

Figure 7:
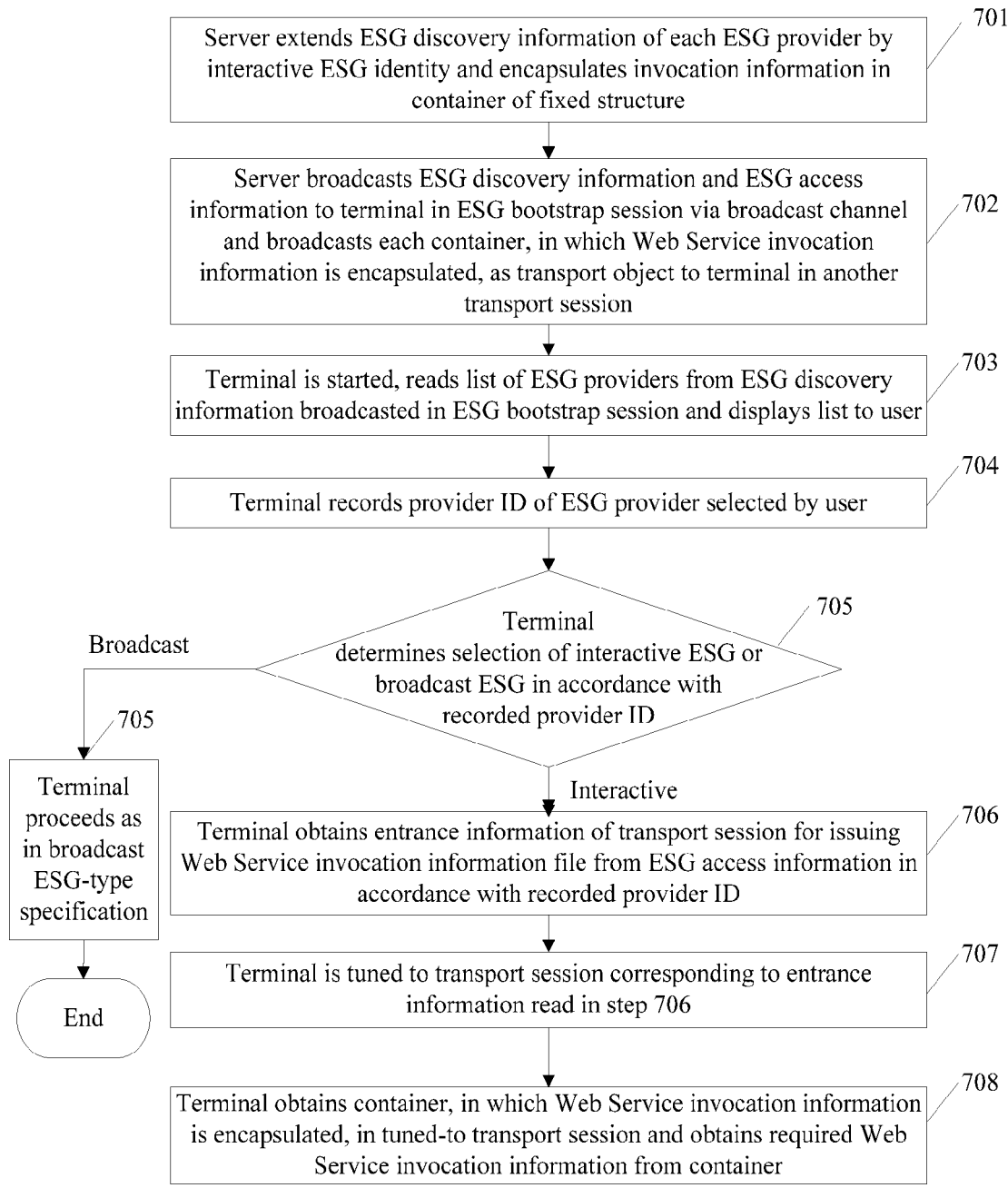
FIG. 7 is a flow chart of a method for discovering an interactive ESG service according to a second preferred embodiment of the invention.

FIG. 7 is a flow chart of a method for discovering an interactive ESG service according to a second embodiment of the invention. This flow includes the following steps.

In step 701, the server extends ESG discovery information of each ESG provider by an interactive ESG identity and encapsulates invocation information in a container of a fixed structure.

One or more pieces of invocation information may be encapsulated in a container. If a plurality of pieces of invocation information is encapsulated in a container, then each piece of invocation information is encapsulated in a sub-structure. Management information of a container is included in a header of the container. A container header shall include the following information: the type of a file encapsulated in a sub-structure, an ID of the sub-structure, which is unique throughout a container; a starting location of the file encapsulated in the sub-structure, a length of the file encapsulated in the sub-structure and version information of the file encapsulated in the sub-structure.

When a plurality of pieces of invocation information is encapsulated in a container, in order to locate rapidly a container and a sub-structure where Web Service invocation information is located, the server generates index information for the invocation information, encapsulates the index information in a separate container and issues it along with the invocation information to the terminal in a transport session.

The index information includes at least the following information: an ID of an interactive ESG provider, an ID of a container where an invocation information file is located and an ID of a sub-structure where the invocation information file is located. Separate encapsulation of an index information file in a container may ensure that the container where the index information is located will be small enough, so that the terminal may read the index information rapidly.

If the ESG provider supports both an interactive and a broadcast ESG, the server shall extend the ESG discovery information by an interactive ESG identity which identifies the corresponding interactive or broadcast ESG service and also extend the ESG access information by an identity of transport session entrance information of the interactive ESG which indicates the corresponding ESG transport session entrance information used in the interactive ESG or in the broadcast ESG.

In step 702, the server broadcasts the ESG discovery information and the ESG access information to the terminal in an ESG bootstrap session via the broadcast channel and also broadcasts each container, in which the Web Service invocation information is encapsulated, as a transport object to the terminal in another transport session.

If there is a container in which the index information is encapsulated, then the container in which the index information is encapsulated is broadcasted as a separate transport object to the terminal.

In step 703, the terminal is started to finish initialization and displays a list of ESG providers to the user in an ESG bootstrap session.

In step 704, the terminal records the provider ID of an ESG provider selected by the user.

In step 705, when determining selection of the interactive ESG according to the recorded provider ID, the terminal executes step 706; and the terminal proceeds as in a broadcast-type specification of the related art and ends the flow upon determination of selection of a broadcast ESG.

Here, the terminal may determine, according to an interactive ESG identity in the ESG discovery information corresponding to the recorded ID of the ESG provider, whether the ESG provider may provide the interactive ESG, and if the ESG provider may provide the interactive ESG, then the terminal may determine selection of the interactive ESG service or a broadcast ESG service according to whether an interactive channel service has been enabled, or whether an interactive channel signal is strong or weak, etc.

In step 706, the terminal obtains the entrance information of the transport session for issuing the Web Service invocation information from the ESG access information according to the recorded provider ID.

In step 707, the terminal is tuned to the transport session determined from the IP address and the port number.

In step 708, the terminal obtains the container in which the Web Service invocation information is encapsulated from the tuned-to transport session and obtains the required Web Service invocation information from the container.

If a plurality of pieces of Web Service invocation information is encapsulated in a container and the server issues the container in which index information is encapsulated to the terminal in a transport session, then step 708 of the terminal includes the following procedure.

The terminal identifies the container in which the index information is encapsulated according to header information of the container and reads the index information of the invocation information file in the transport session; the terminal obtains the corresponding container ID and sub-structure ID from the read index information according to the recorded provider ID; and the terminal obtains the container, in which the required invocation information is encapsulated, from the transport session and obtains the required Web Service invocation information from the container according to the obtained sub-structure ID.

Figure 8:
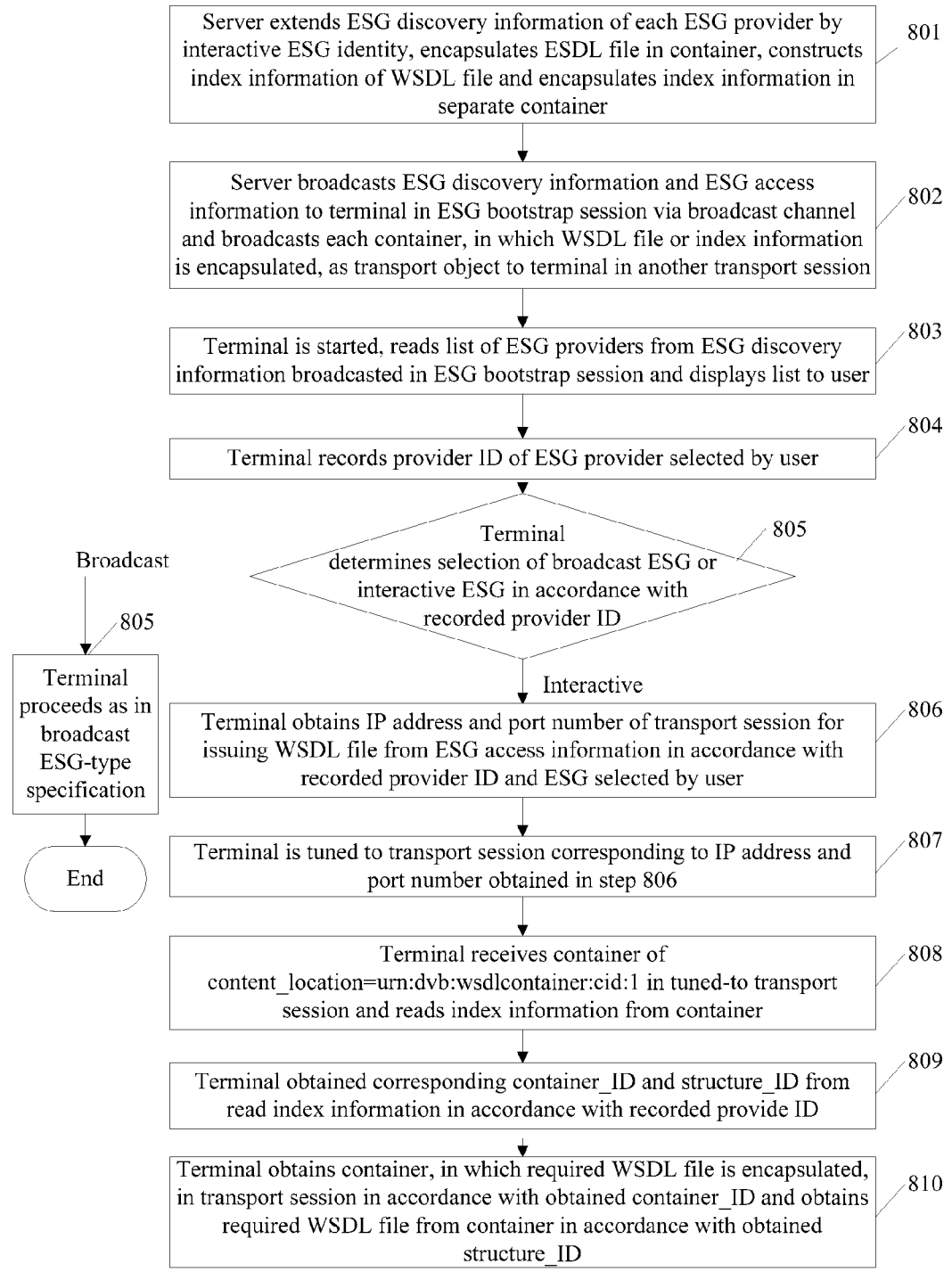
FIG. 8 is a flow chart of an implementation of the embodiment illustrated in FIG. 7.

FIG. 8 is a flow chart of an implementation of the embodiment illustrated in FIG. 7, and in this implementation, invocation information is described in the WSDL standard, that is, discovery information and invocation information of a Web Service is stored in a WSDL file, and it is assumed that a plurality of WSDL files are encapsulated in a container. The FLUTE is used as a transport protocol. This flow includes the following steps.

In step 801, the server extends ESG discovery information of each ESG provider by an interactive ESG identity, encapsulates a WSDL file in a container of a fixed structure, constructs index information of the WSDL file and encapsulates it in a separate container.

If the ESG provider supports only an interactive ESG or a broadcast ESG, the server extends the ESG discovery information of each ESG provider by an interactive ESG identity as in Table 1, and if the ESG provider supports both the interactive ESG and the broadcast ESG, the server shall extend the ESG discovery information of each ESG provider by an interactive ESG identity as in Table 1 and also extend the ESG access information of each ESG provider by an identity of transport session entrance information of the interactive ESG as in Table 2.

The server encapsulates the WSDL file in a container of a structure as illustrated in Table 5 and Table 6. Data types of respective fields are unsigned integers and most significant bit first, i.e., uimsbf. Table 5 illustrates a structure of the container, and Table 6 illustrates a value range and a meaning of the structure_type field in the container illustrated in FIG. 5.

In a transport session, each container is transported as a transport object and is described with a File element in FDT-Instance. A content_location attribute in the File element identifies uniquely each container and includes the ID of the container, and A content_type attribute indicates the type of contents carried in the container.

TABLE 5

| Syntax | Length of field (in bits) | Meaning |
|---|---|---|
| container( ){ | | |
|   Container_header{ | | |
|     num_structures | 8 | Number of sub-structures in container |
| for(i=0;i<num_structures;i++){ | | |
|       structure_type[i] | 8 | Type of the $i^{th}$ sub-structure in container, which takes a value range as illustrated in Table 7 |
|       structure_id[i] | 8 | ID of the $i^{th}$ sub-structure |
|       structure_ptr[i] | 24 | Point to starting location of the $i^{th}$ sub-structure |
|       structure_length[i] | 24 | Length of data included in the $i^{th}$ sub-structure |
|       structure_version[i] | | Version of data included in the $i^{th}$ sub-structure |
|     } | | |
|   } | | |
|   for (j=0; j<byte_count; j++) { | | |
|     structure_body[j] | | |
|   } | | |
| } | | |

TABLE 6

| Value | Meaning |
|---|---|
| 0x01 | WSDL file (WSDL File) |
| 0x02 | WSDL index (WSDL_index) |
| Others | Reserved |

In order to locate rapidly the container and the sub-structure where the Web Service invocation information file is located, index information illustrated in FIG. 7 is defined. Data types of respective fields in Table 7 are unsigned integers and most significant bit first, i.e., uimsbf. Separate encapsulation of the index information in a container may ensure that the container where the index information is located will be small enough, so that the terminal may read the index information rapidly.

As may be seen from Table 7, the container in which the index information of the WSDL file is encapsulated includes the following information: the number of WSDL files carried in the container, an ID of an interactive ESG provider, the ID of the container which carries a WSDL file descriptive of the interactive ESG and an ID of a sub-structure in the container in which the WSDL file is carried. Separate encapsulation of the index information file in a container may ensure that the container where the index information is located will be small enough, so that the terminal may read the index information rapidly.

TABLE 7

| Syntax | Length of field (in bits) | Meaning |
|---|---|---|
| WSDL_index{ | | |
|   num_of_WSDL | 8 | Number of WSDL files carried in the container |
| for(i=0;i<num_of_WSDL;i++){ | | |
|     providerID | 8 | ID of interactive ESG provider |
|     container_ID | 32 | ID of container which carries WSDL file descriptive of interactive ESG |
|     structure_ID | 8 | ID of sub-structure in container in which WSDL file is carried |
|   } | | |
| } | | |

In order to identify a container in which index information is encapsulated, it is necessary to request the Internet Assigned Number Authority (IANA) standard organization for defining a new content type of um:dvb:wsdlcontainer and to set the attribute of an ID of content_location transport object n of the File element descriptive of the container as um:dvb:wsdlcontainer:cid: 1. Further, the content_type attribute of all containers is set as application/vnd.dvb.wsdl-container.

In step 802, the server broadcasts the ESG discovery information and the ESG access information to the terminal in a bootstrap session via a broadcast channel and broadcasts each container, in which a WSDL file or index information is encapsulated, as a transport object to the terminal in another transport session.

Figure 9:
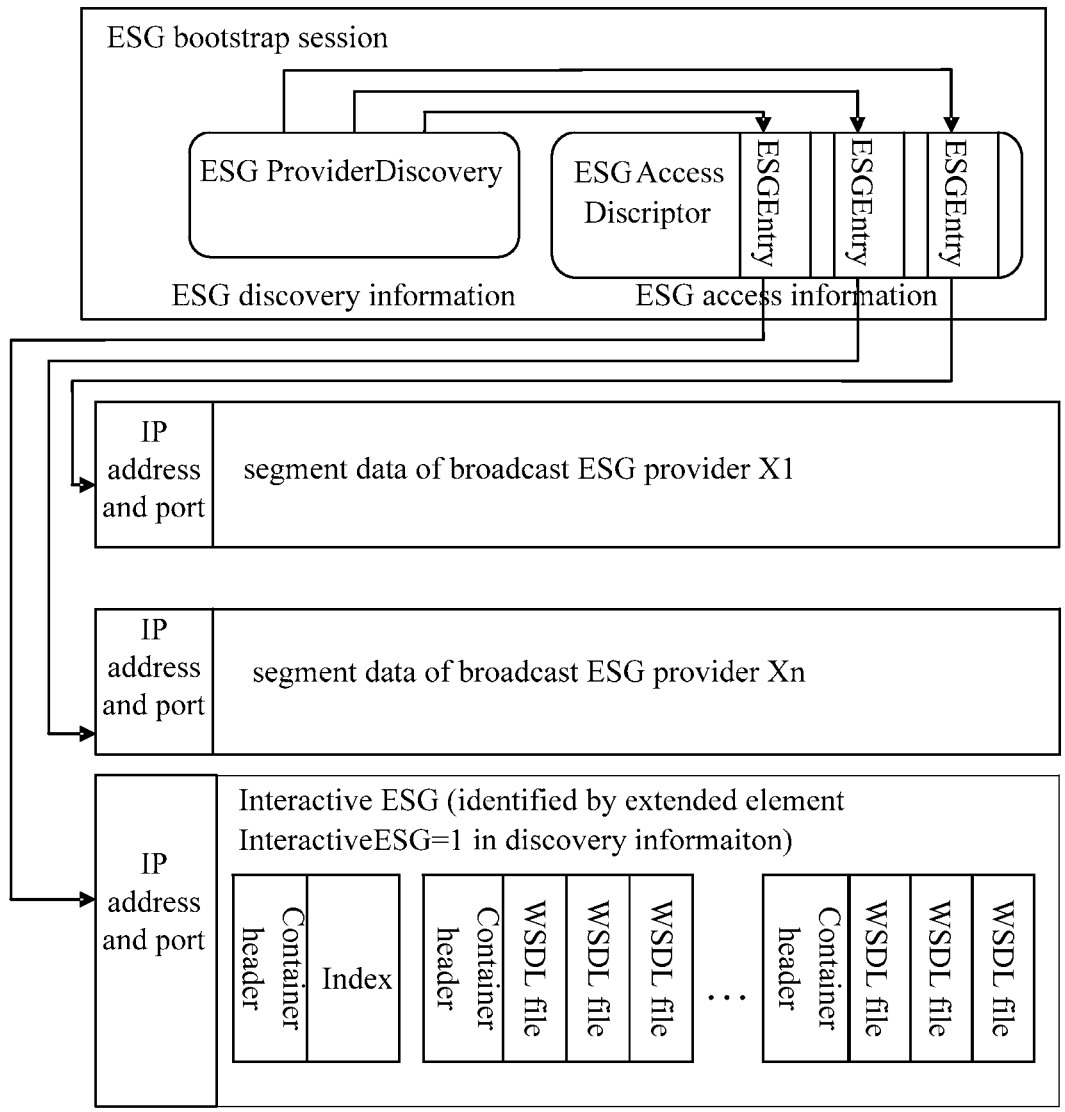
FIG. 9 is a schematic diagram of broadcasting a plurality of containers to a terminal through a transport session.

Referring to FIG. 9, FIG. 9 is a schematic diagram of broadcasting a plurality of containers to a terminal via a transport session. The interactive ESG illustrated in the schematic diagram includes a plurality of containers, in which one container includes only a container header and index information and the other containers each includes a container header and a plurality of WSDL files of Web Service invocation information.

In step 803, the terminal is started to finish initialization and displays a list of ESG providers to the user in an ESG bootstrap session.

In step 804, the terminal records the ID of ESG provider selected by the user.

In step 805, when determining selection of the interactive ESG according to the recorded provider ID, the terminal executes step 806; and when determining selection of a broadcast ESG, the terminal proceeds as in a broadcast-type specification of the related art and ends the flow.

In step 806, the terminal obtains an IP address and a port number of the transport session for issuing a WSDL file from the ESG access information in accordance with the recorded provider ID.

If the ESG provider provides only the interactive ESG service, the terminal obtains an IP address and a port number of the transport session for issuing a WSDL file from the ESG access information according to the recorded provider ID.

If the ESG provider may provide both the interactive ESG service and the broadcast ESG service, the terminal obtains an IP address and a port number of the transport session for issuing a WSDL file from the ESG access information according to the recorded provider ID, a selected ESG mode and the AccessMethod field in the ESG access information.

In step 807, the terminal is tuned to the transport session corresponding to the IP address and the port number obtained in step 806.

In step 808, the terminal receives the container of content_location=urn:dvb:wsdlcontainer:cid:1 in the tuned-to transport session and reads the index information from the container.

In step 809, the terminal obtains the corresponding container ID (container ID) and sub-structure ID (structure_ID) from the read index information according to the recorded provider ID.

In step 810, the terminal obtains the container, in which the required WSDL file is encapsulated, in the transport session according to the obtained container ID and obtains the required WSDL file from the container according to the obtained structure_ID.

In this solution, the invocation information file is encapsulated in a container for easy management by the server. The invocation information file of the interactive ESG is issued in a broadcast channel so as to eliminate the need of submitting an enquiry request to the server and thereby to save the bandwidth of the interactive channel, and it is not necessary for the provider to provide a dedicated interactive ESG service enquiry server, thereby saving an operation cost.

In the third solution of discovering an ESG service according to an embodiment of the invention, entrance information of the interactive ESG is stored in discovery information or access information of each ESG provider by the server. Since the interactive ESG provides a service through a Web Service, the entrance information of the interactive ESG may be a Uniform Resource Locator (URL) of the Web Service.

When determining selection of the interactive ESG service according to the ESG provider selected by the user, the terminal obtains the entrance information of the interactive ESG service from the ESG discovery information or access information and obtains Web Service invocation information according to the entrance information.

Figure 10:
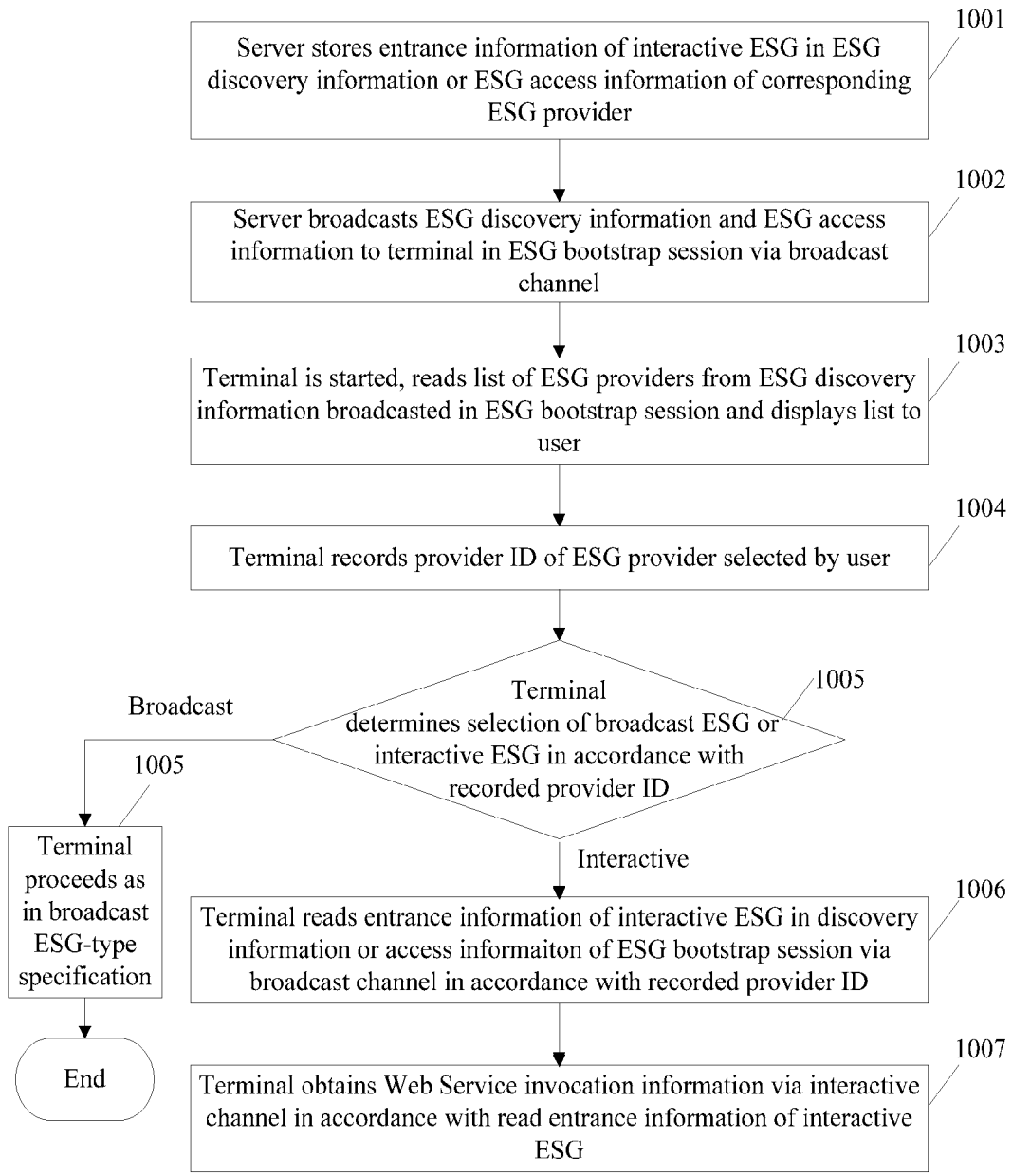
FIG. 10 is a flow chart of a method for discovering an interactive ESG service according to a third preferred embodiment of the invention.

FIG. 10 is a flow chart of a method for discovering an interactive ESG service according to a third preferred embodiment of the invention. This flow includes the following steps.

In step 1001, entrance information of the interactive ESG is stored in ESG discovery information or access information of a corresponding ESG provider by the server.

Here, the entrance information of the interactive ESG may be a URL of a Web Service, and this embodiment provides two specific ways of storing interactive ESG entrance information in the ESG discovery information.

In the first way, the service extends the ESG discovery information by an interactive ESG identity and also stores the URL of the Web Service in the discovery information of the ESG provider.

If the server stores the URL of the Web Service in the ESG discovery information, the ESG discovery information will include two pieces of discovery information of the ESG provider with the same provider ID. These two pieces of discovery information of the ESG provider may be distinguished by extending the ESG discovery information by an interactive ESG identity.

Preferably, the ESG discovery information of each ESG provider is extended by an interactive ESG identity as in Table 1. The URL of the Web Service may also be stored in the ProviderinformationURL element of ESGProviderType illustrated in Table 1.

In the second way, an InteractiveESGURL element is newly added in ESGProviderType of the ESG discovery information of the ESG provider, and if the corresponding ServiceProvider element indicates that it is the interactive ESG, the value of this element represents entrance information of the interactive ESG; otherwise the value of this element is null. Table 8 illustrates the second method for extending the interactive ESG entrance information.

TABLE 8

| Parameter | Type | Number of occurrences | Meaning | Data type |
| --- | --- | --- | --- | --- |
| ProviderURI | E1 | 1 | URI of ESG provider | Character string |
| ProviderName | E1 | 1 | Name of ESG provider | Character string |
| ProviderLogo | E1 | 0...1 | Logo information of ESG provider | Embedded binary file |
| ProviderID | E1 | 1 | ID of ESG provider | Positive integer |
| ProviderInformationURL | E1 | 0...1 | Link to other information of ESG provider | Character string |
| PrivateAuxiliaryData | E1 | 0...1 | Auxiliary data | Character string |
| InteractiveESGURL | E1 | 0...1 | Access entrance information of interactive ESG | Character string |
| RelatedESG | E1 | 0...N | Description of related ESG | |
| RelatedProviderID | E2 | 1 | ID of related ESG provider | Positive integer |
| RelationType | E2 | 1 | Relation type, see Table X1 | Integer |
| DataRange | E2 | 0...1 | Data range | |
| RangeKey | E3 | 0...N | Key for determination of data range | Character string |
| KeyDataType | A | 1 | Data type of key | Character string |
| RangeFrom | A | 1 | Starting value of data range | Data type identified with KeyDataType |
| RangeTo | A | 1 | Ending value of data range | Data type identified with KeyDataType |

This embodiment further provides two specific ways of storing interactive ESG entrance information in ESG access information.

In the first way, as illustrated in Table 9, Accesstype in the ESG access information indicates the type of an ESG entrance address, i.e., an interactive ESG identity. This field with a value of 1 indicates a broadcast ESG, and this field with a value of 2 indicates the interactive ESG. There are further added in Table 9 a field of URL indicating an entrance address of the interactive ESG and a field of URL_Length indicating the length of the entrance address of the interactive ESG.

In step 1002, the server broadcasts the ESG discovery information and the ESG access information to the terminal in an ESG bootstrap session via the broadcast channel.

A detailed procedure in which the terminal obtains entrance information of an interactive ESG service includes the following steps.

In step 1003, the terminal is started, reads a list of ESG providers from the ESG discovery information broadcasted in the ESG bootstrap session and displays the list to the user.

In step 1004, the terminal records the provider ID of an ESG provider selected by the user.

TABLE 9

| Syntax | Length of filed (in bits) | Meaning |
|---|---|---|
| ESGEntry{ | | |
|   n_o_AccessPoints | 4 | Number of ESG entrance addresses |
|   ProviderID | 16 | Provider ID |
|   for(i=0; i< n_o_AccessPoints; i++){ | | |
|     Accesstype | 4 | Type of ESG entrance address, the value range is: 1: broadcast ESG 2: interactive ESG Others: reserved |
|     if (Accesstype=0x01){ | | |
|       BroadAddressLength | 8 | Length of broadcast ESG address |
|       BroadESGAddress | | Broadcast ESG address |
|     } | | |
|     else if (Accesstype=0x02){ | | |
|       URL_Length | | Length of interactive ESG entrance address |
|       URL | | Interactive ESG entrance address |
|     } | | |
|   } | | |
| } | | |

In the access information presented in Table 9, both an entrance address of the interactive ESG and an entrance address of the broadcast ESG are carried in an ESGEntry, which are distinguished by values in the Accesstype field. In a practical implementation, only an entrance address of the broadcast ESG or an entrance address of the interactive ESG may by carried in the ESGEntry, and corresponding identity information of the broadcast or interactive ESG may also be added in the corresponding ESGEntry.

In the second way of extending ESG access information of the ESG provider by interactive ESG entrance information, two fields of InteractiveESGURL and InteractiveESGURL-Length are added in the ESG access information of the ESG provider as illustrated in FIG. 10.

In step 1005, when determining selection of the interactive ESG according to the recorded provider ID, the terminal executes step 1006; and when determining selection of the broadcast ESG, the terminal proceeds as in a broadcast ESG-type specification and ends the flow.

Here, if the ESG provider may provide both the interactive ESG and the broadcast ESG, the terminal may determine selection of the interactive ESG service or the broadcast ESG service according to whether an interactive channel service has been enabled or whether an interactive channel signal is strong or weak, etc.

In step 1006, the terminal reads the entrance information of the interactive ESG from the discovery information or the

TABLE 10

| Syntax | Length of filed (in bits) | Meaning |
|---|---|---|
| ESGEntry{ | | |
|   n_o_AccessPoints | 4 | Number of ESG entrance addresses |
|   ProviderID | 16 | Provider ID |
|   for(i=0; i< n_o_AccessPoints; i++){ | | |
|     AccessPointLength | 8 | Length of ESG entrance address in units of bytes |
|     InteractiveESGURLLength | 8 | Length of entrance address of interactive ESG access information in units of bytes. Zero indicates null value of InteractiveESGURL. |
|     InteractiveESGURL | | Entrance address of interactive ESG access information |
|     BroadESGAddressLength | | Length of broadcast ESG address |
|     BroadESGAddress | | Broadcast ESG address |
|   } | | |
| } | | | access information of the ESG bootstrap session via the broadcast channel according to the recorded provider ID.

If the entrance information of the interactive ESG, i.e., the URL of the Web Service, is stored in the ProviderinformationURL element of the ServiceProvider element of the ESG discovery information as illustrated in Table 1, the terminal may obtain the URL of the Web Service of the interactive ESG by reading the value of the ProviderinformationURL element.

If the URL of the Web Service of the interactive ESG is stored in InteractiveESGURL newly added in the ESG discovery information as illustrated in Table 8, the terminal may obtain the URL of the Web Service of the interactive ESG by reading the value of InteractiveESGURL.

With the extension by the URL of the Web Service of the interactive ESG as in Table 9, the terminal may obtain the URL of the Web Service of the interactive ESG from the URL and URL Length in the ESG access information.

With the extension by the URL of the Web Service of the interactive ESG as in Table 10, the terminal may obtain the URL of the Web Service of the interactive ESG by reading InteractiveESGURL and InteractiveESGURLLength in the ESG access information.

In step 1007, the terminal obtains the Web Service invocation information from the interactive channel according to the read interactive ESG entrance information.

Here, the Web Service invocation information may be described in the WSDL standard, that is, the discovery information and invocation information of the Web Service is stored in a WSDL file, and the FLUTE protocol may be used as a transport protocol, that is, all transport sessions may be FLUTE sessions.

An advantage of this solution lies in that issuing of the entrance information of the interactive ESG service via the broadcast channel may save the bandwidth of the interactive channel to some degree.

In the fourth solution of discovering an ESG service according to an embodiment of the invention, Web Service invocation information is stored in ESG discovery information of each ESG provider by the server and issued to the terminal in a bootstrap session via a broadcast channel. When the user selects the interactive ESG service, the terminal obtains the Web Service invocation information of the interactive ESG service from the ESG discovery information.

Figure 11:
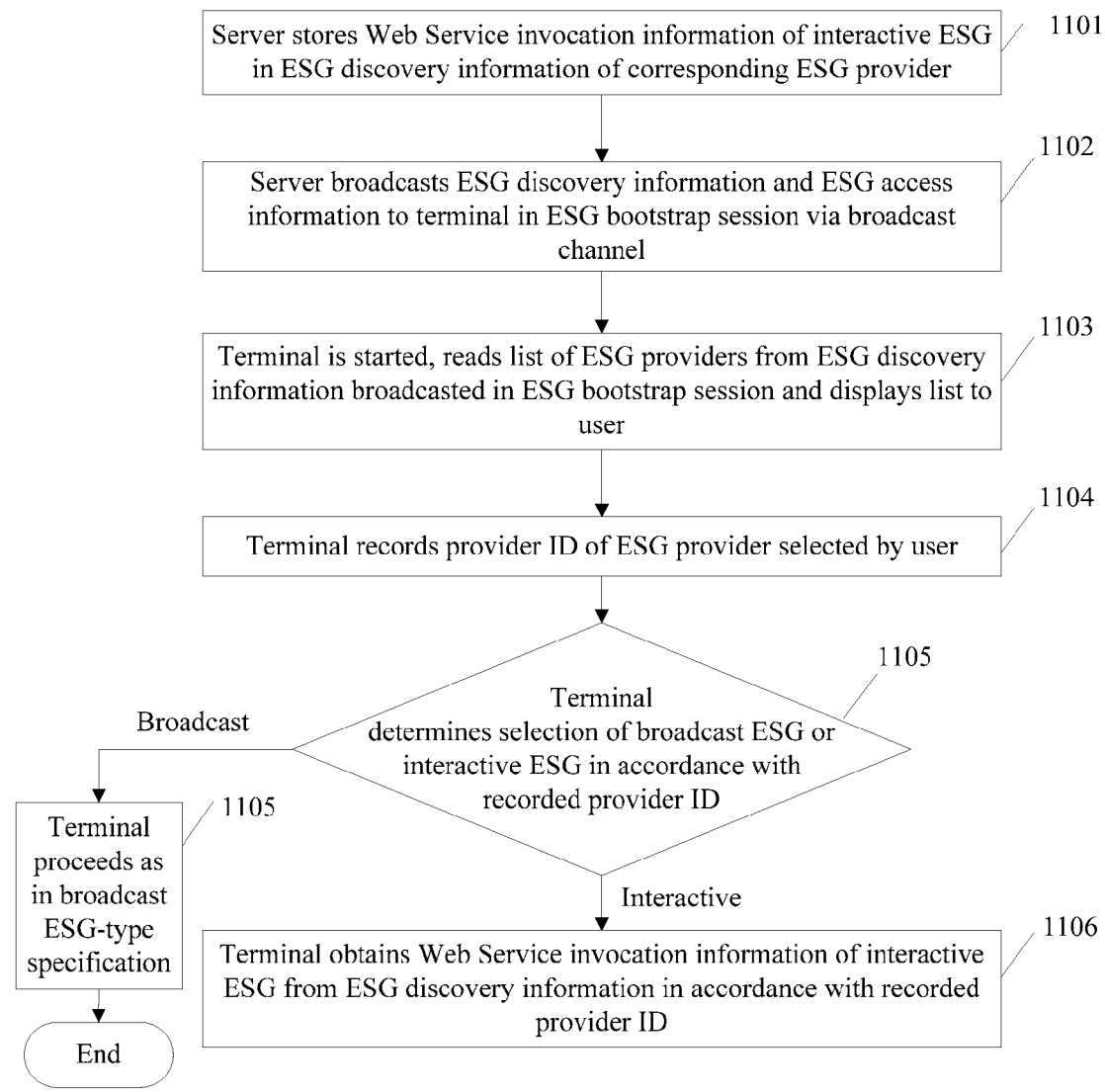
FIG. 11 is a flow chart of a method for discovering an interactive ESG service according to a fourth preferred embodiment of the invention.

FIG. 11 is a flow chart of a method for discovering an interactive ESG service according to a fourth embodiment of the invention. This flow includes the following steps.

In step 1101, Web Service invocation information of the interactive ESG service is stored by the server in ESG discovery information of a corresponding ESG provider.

The Web Service invocation information of the interactive ESG service is stored in the ESG discovery information in the first way that the ESG discovery information of the ESG provider is extended by an interactive ESG identity, possibly as in Table 1, and also the Web Service invocation information of the interactive ESG service is stored in a PrivateAuxiliaryData element of ESGProviderType of the ESG discovery information.

In the second way, there is newly added in the ESG discovery information of the ESG provider an element for storing the Web Service invocation information of the interactive ESG service, for example, possibly as in Table 11, an InteractiveESGWSDL element is newly added in the ESG discovery information. If the value of the InteractiveESGWSDL element is null, it indicates that the ESG provider may not provide the interactive ESG service; and if the ESG provider may provide the interactive ESG service, the Web Service invocation information of the interactive ESG service is stored in the InteractiveESGWSDL element.

The Web Service invocation information may be described in the WSDL standard, that is, the Web Service invocation information is stored in a WSDL file, and the FLUTE protocol is used as a transport protocol.

TABLE 11

| Parameter | Type | Number of occurrences | Meaning | Data type |
| --- | --- | --- | --- | --- |
| ProviderURI | E1 | 1 | URI of ESG provider | Character string |
| ProviderName | E1 | 1 | Name of ESG provider | Character string |
| ProviderLogo | E1 | 0 . . . 1 | Logo information of ESG provider | Embedded binary file |
| ProviderID | E1 | 1 | ID of ESG provider | Positive integer |
| ProviderInformationURL | E1 | 0 . . . 1 | Link to other information of ESG provider | Character string |
| PrivateAuxiliaryData | E1 | 0 . . . 1 | Auxiliary data | Character string |
| InteractiveESGWSDL | E1 | 0 . . . 1 | Invocation information file of interactive ESG | Character string |

In step 1102, the server issues the ESG discovery information and access information to the terminal in an ESG bootstrap session via a broadcast channel.

In step 1103, the terminal is started to finish initialization and provides a list of ESG providers to the user in the ESG bootstrap session.

In step 1104, the terminal records the provider ID of an ESG provider selected by the user.

In step 1105, the terminal determines selection of the interactive ESG service or the broadcast ESG service according to the recorded provider ID. If the interactive ESG service is selected, the terminal executes step 1106; and if the broadcast ESG service is selected, the terminal proceeds as in a broadcast ESG-type specification and ends the flow.

Here, the terminal may firstly determine, according to the interactive ESG identity in the ESG discovery information corresponding to the recorded ID of the ESG provider or whether the element newly added in the ESG discovery information for storing the Web Service invocation information of the interactive ESG service is null, whether the ESG provider may provide the interactive ESG, and if the ESG provider may provide the interactive ESG, the terminal may determine selection of the interactive ESG service or the broadcast ESG service according to whether an interactive channel service has been enabled or whether an interactive channel signal is strong or weak, etc.

If the Web Service invocation information of the interactive ESG service is stored in the first way mentioned above, the terminal may determine, according to the interactive ESG identity in the corresponding ESG discovery information, whether the ESG provider may provide the interactive ESG service.

If the Web Service invocation information of the interactive ESG service is stored in the second way mentioned above, the terminal may determine whether the ESG provider may provide the interactive ESG service according to whether the element extended in the corresponding ESG discovery information for storing the Web Service invocation information of the interactive ESG service is null.

In step 1106, the terminal obtains the Web Service invocation information of the interactive ESG service from the ESG discovery information in accordance with the recorded ESG provider ID.

If the Web Service invocation information of the interactive ESG service is stored in the first method mentioned above, the terminal reads the Web Service invocation information of the interactive ESG service from the PrivateAuxiliaryData element of the corresponding ESG discovery information according to the recorded ESG provider ID.

If the Web Service invocation information of the interactive ESG service is stored in the second way illustrated in Table 1, the terminal reads the Web Service invocation information of the interactive ESG service from the InteractiveESGWSDL element of the corresponding ESG discovery information according to the recorded ESG provider ID.

An advantage of this solution lies in that issuing of the invocation information file of the interactive ESG service in the broadcast channel may eliminate the need of the terminal submitting enquiry information to the server, so as to effectively save the bandwidth of the interactive channel. Further, it is not necessary for the provider to provide a dedicated interactive ESG service enquiry server, thereby saving the operation cost.

In the fifth solution of discovering an ESG service according to an embodiment of the invention, entrance information of a transport session for issuing an invocation information file is stored by the server in ESG discovery information and is issued to the terminal in an ESG bootstrap session via a broadcast channel. When determining selection of the interactive ESG service, the terminal obtains the entrance information of the transport session for issuing the invocation information file from the ESG discovery information of the ESG bootstrap session via the broadcast channel, and then is tuned to the transport session and obtains the Web Service invocation information of the interactive ESG service.

Figure 12:
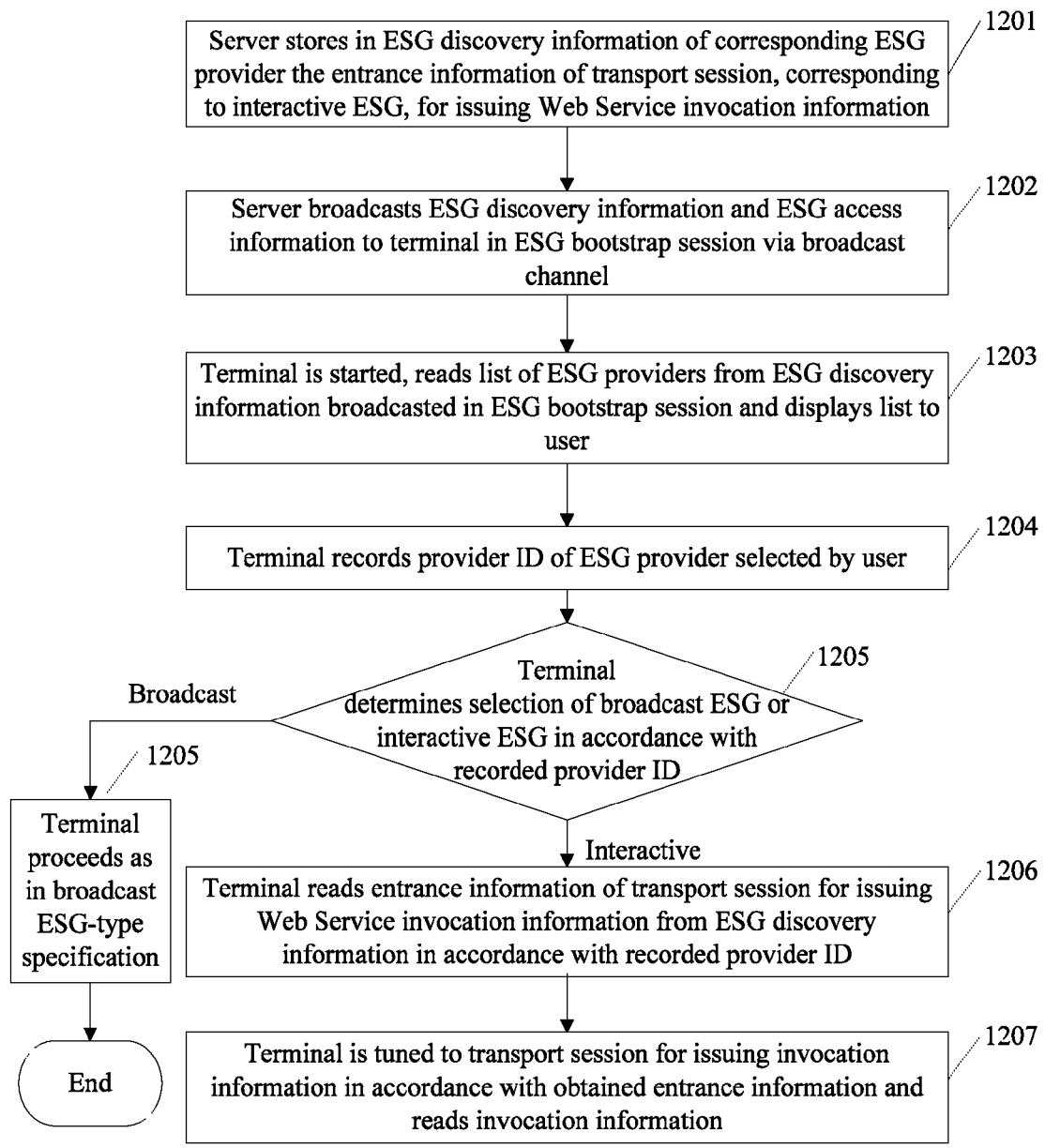
FIG. 12 is a flow chart of a method for discovering an interactive ESG service according to a fifth preferred embodiment of the invention.

FIG. 12 is a flow chart of a method for discovering an interactive ESG service according to a fifth preferred embodiment of the invention. This flow includes the following steps.

In step 1201, entrance information of a transport session for issuing Web Service invocation information corresponding to the interactive ESG is stored by the server in ESG discovery information of a corresponding ESG provider.

The ESG discovery information may further be extended by an interactive ESG identity to indicate whether the ESG provider may provide the interactive ESG service.

If the server transmits a plurality of invocation information files in a transport session, the server shall add identity information of the invocation information in the discovery information of the ESG provider.

In step 1202, the server issues the ESG discovery information and access information to the terminal in an ESG bootstrap session via a broadcast channel.

In step 1203, the terminal is started to finish initialization and displays a list of ESG providers to the user in the ESG bootstrap session.

In step 1024, the terminal records the provider ID of an ESG provider selected by the user.

In step 1205, the terminal determines selection of the interactive ESG service or the broadcast ESG service according to the recorded provider ID. If the interactive ESG service is selected, the terminal executes step 1206, and if a broadcast ESG service is selected, the terminal proceeds as in a broadcast ESG-type specification and ends the flow.

Here, the terminal may determine whether the ESG provider may provide the interactive ESG according to the ESG discovery information corresponding to the recorded ID of the ESG provider. If the ESG discovery information is extended by an interactive ESG identity, the terminal may determine whether the corresponding ESG provider may provide the interactive ESG service in accordance with the interactive ESG identity; and if only a corresponding element in which the entrance information of the transport session for issuing the Web Service invocation information is stored is added in the ESG discovery information, the terminal may determine whether the corresponding ESG provider may provide the interactive ESG service in accordance with whether the element is null.

If the terminal determines that the ESG provider may provide the interactive ESG, the terminal may determine selection of the interactive ESG service or the broadcast ESG service in accordance with whether an interactive channel service has been enabled or whether an interactive channel signal is strong or weak, etc.

In step 1206, the terminal obtains the entrance information of the transport session for issuing the Web Service invocation information from the ESG discovery information in accordance with the recorded ESG provider ID.

If the server transmits a plurality of Web Service invocation information files in a transport session, the terminal obtains the entrance information of the transport session for issuing the Web Service invocation information and the identity information of the invocation information from the ESG discovery information according to the recorded ESG provider ID.

In step 1207, the terminal is tuned to the transport session for issuing the Web Service invocation information according to the obtained entrance information of the transport session and reads the Web Service invocation information.

If the server transmits a plurality of Web Service invocation information files in a transport session, the terminal is tuned to the transport session for issuing the Web Service invocation information in accordance with the read entrance information and obtains the Web Service invocation information from the transport session in accordance with the obtained identity information of the invocation information.

Figure 13:
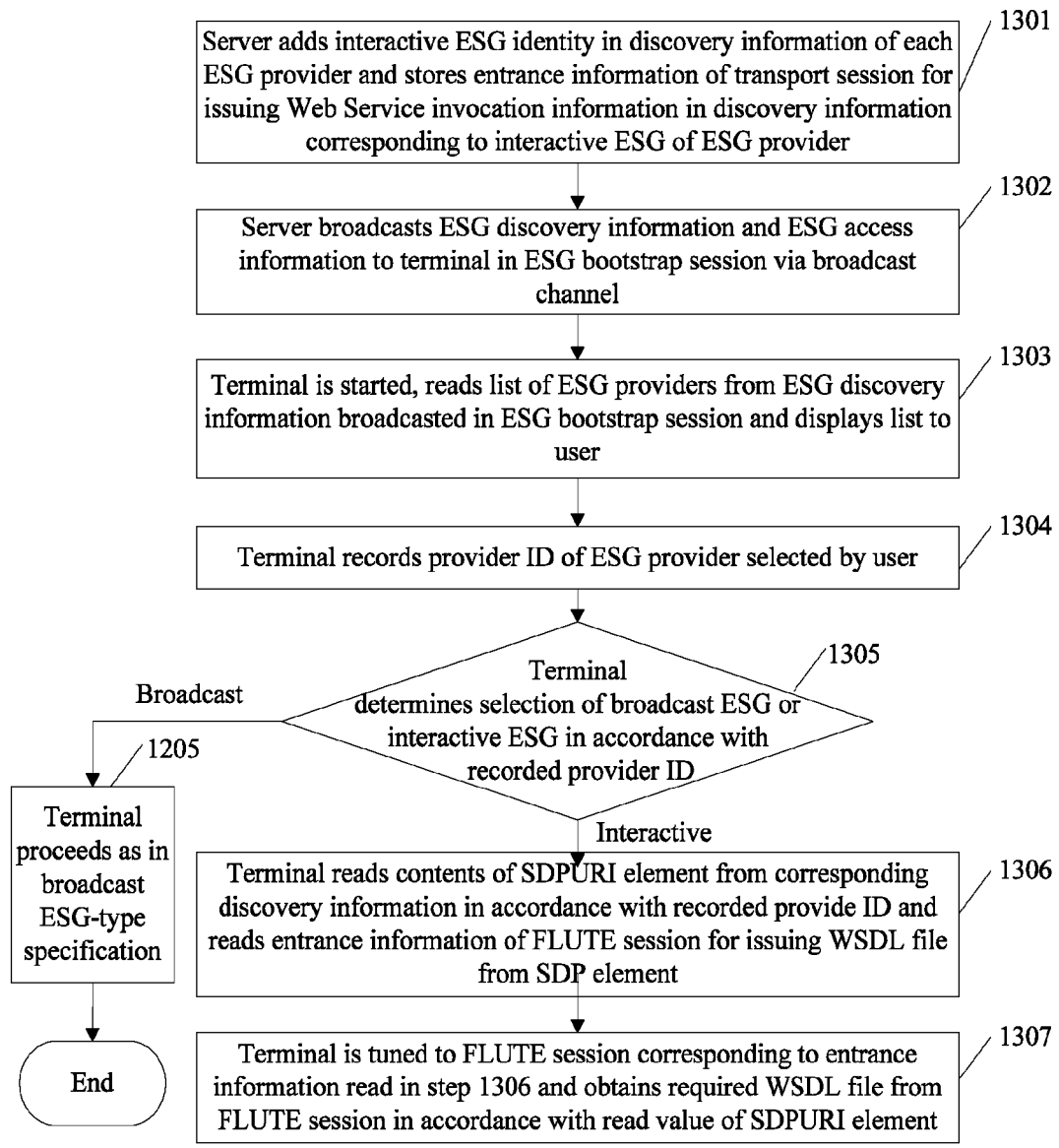
FIG. 13 is a flow chart of an implementation of the embodiment illustrated in FIG. 12.

FIG. 13 is a flow chart of an implementation of the embodiment illustrated in FIG. 12, and in this implementation, the Web Service invocation information is described in the WSDL standard, that is, the Web Service discovery information and invocation information are stored in a WSDL file. The FLUTE protocol is used as a transport protocol. The flow includes the following steps.

In step 1301, the server extends discovery information of each ESG provider by an interactive ESG identity and stores entrance information of a transport session for issuing a WSDL file and identity information of the WSDL file in discovery information corresponding to the interactive ESG of the ESG provider.

Extension by the interactive ESG identity is performed as in Table 1.

The entrance information of the transport session for issuing the WSDL file may be stored in the ESG discovery information by adding in the ESG discovery information a character string which describes the entrance information of the transport session for issuing the WSDL file, such as the fields of SDP and SDPURL illustrated in Table 12. The SDP field describes entrance information of the FLUTE session for issuing a WSDL file, and the SDPURI field is a uniform resource identifier of a WSDL file in FLUTE session described by the SDP.

When the value of the interactive ESG identity is 1, that is, the ESG service is interactive, the descriptor of discovery information of the ESG provider includes two elements of SDP and SDPURI; otherwise neither of the two elements will be included.

An SDP file is embedded in the SDP element, and this file describes the entrance information of the FLUTE session for issuing the WSDL file. The SDPURI element includes a URI through which the WSDL file corresponding to the interactive ESG selected by the user may be found in the FLUTE session described by the SDP element.

In step 1306, the terminal reads contents of the SDPURI element from the corresponding ESG discovery information according to the recorded provider ID and reads the entrance information of the FLUTE session for issuing the WSDL file from the SDP element.

In step 1307, the terminal is tuned to the FLUTE session corresponding to the entrance information read in step 1306 and obtains the required WSDL file from the FLUTE session by the read value of the SDPURI element.

An advantage of this solution lies in that issuing of the Web Service invocation information file of the interactive ESG service via the broadcast channel may eliminate the need of the terminal submitting an enquiry request to the server, so as to save the bandwidth of an interactive channel effectively. Further, it is not necessary for the provider to provide a dedicated interactive ESG service enquiry server, thereby saving an operation cost.

In the five solutions of discovering an ESG service according to the above embodiments of the invention, after obtaining the Web Service invocation information file of the interactive ESG, the terminal parses the file and obtains capability information of the interactive ESG service. Then, the terminal submits a data request to the interactive ESG provider via an interactive channel, and the interactive ESG provider receives and processes the data request to generate resultant data and returns ESG data complying with the data request to the terminal via the interactive channel.

TABLE 12

| Parameter | Type | Number of occurrences | Meaning | Data type |
|---|---|---|---|---|
| ProviderURI | E1 | 1 | URI of ESG provider | Character string |
| ProviderName | E1 | 1 | Name of ESG provider | Character string |
| ProviderLogo | E1 | 0 . . . 1 | Logo information of ESG provider | Embedded binary file |
| ProviderID | E1 | 1 | ESG Provider ID | Positive integer |
| ProviderInformationURL | E1 | 0 . . . 1 | Link to other information of ESG provider | Character string |
| PrivateAuxiliaryData | E1 | 0 . . . 1 | Auxiliary data of provider | Character string |
| InteractiveESG | E1 | 1 | Flag bit of interactive ESG or not | Boolean type |
| SDP | E1 | 0 . . . 1 | Entrance information of FLUTE session for issuing WSDL file | Character string |
| SDPURI | E1 | 0 . . . 1 | Uniform resource identity pointing to a WSDL file in FLUTE session described by SDP | Character string |

The InteractiveESG element in Table 12 may be omitted, and the terminal determines whether the corresponding ESG provider may provide the interactive ESG service in accordance with whether SDP and SDPURI are null.

In step 1302, the server issues the ESG discovery information and access information to the terminal in an ESG bootstrap session via a broadcast channel.

In step 1303, the terminal is started to finish initialization and displays a list of ESG providers to the user in the ESG bootstrap session.

In step 1304, the terminal records the provider ID of an ESG provider selected by the user.

In step 1305, the terminal determines selection of the interactive ESG service or the broadcast ESG service according to the recorded ESG provider ID. If the interactive ESG service is selected, the terminal executes step 1306; and if a broadcast ESG service is selected, the terminal proceeds as in a broadcast ESG-type specification and ends the flow.

In the five solutions of discovering an ESG service according to the above embodiments, before the server issues the ESG discovery information and access information to the terminal in an ESG bootstrap session via a broadcast channel, the following step may further be included: the server indicates a relation between related broadcast ESG and interactive ESG in the ESG discovery information and/or access information.

The relation between a broadcast ESG and a related interactive ESG may refer to a relation between ranges of data they send. Several relations between them will be listed below.

1) The broadcast ESG transmits primary data and the interactive ESG transmits auxiliary data as required by the user. At this time, it is called that the broadcast ESG is accompanied by the interactive ESG and the interactive ESG supplements the broadcast ESG.

2) The broadcast ESG transmits a part of the primary data, the interactive ESG transmits another part of the primary data, and the data they send constructs a complete ESG. At this time, the broadcast ESG and the interactive ESG are in a parallel relation.

3) The broadcast ESG and the interactive ESG transmit the same data. At this time, the broadcast ESG and the interactive ESG are in a duplicate relation.

4) The broadcast ESG sends complete ESG data and the interactive ESG sends a part of ESG data. At this time, the broadcast ESG and the interactive ESG are in a partial duplicate relation.

There are numerous other relations between the interactive ESG and a related broadcast ESG, which will not be exhausted here. For brief descriptions, a relation between the interactive ESG and a related broadcast ESG may be represented with a preset number. Table 13 presents an implementation of representing relations between the interactive ESG and related broadcast ESG by numbers.

If a relation between the interactive ESG and a related broadcast ESG is indicated in the ESG discovery information, the ServiceProvider element of the ESG discovery information illustrated in Table 1 or Table 11 may be further extended, for example, the extension of Table 1 is illustrated in Table 14. The extension of Table 11 is the same as that of the Table 1 and descriptions thereof will not be repeated here.

The ServiceProvider element is extended by a type of the relation between the ESG and the related ESG, and the extension information includes the following contents: the ProviderID of the related ESG, the type of the related ESG, that is, the ESG is the broadcast ESG or the interactive ESG, and the type of the relation with the related ESG

TABLE 14

| Parameter | Type | Number of occurrences | Meaning | Data type |
|---|---|---|---|---|
| ProviderURI | E1 | 1 | URI of ESG provider | Character string |
| ProviderName | E1 | 1 | Name of ESG provider | Character string |
| ProviderLogo | E1 | 0 . . . 1 | Logo information of ESG provider | Embedded binary file |
| ProviderID | E1 | 1 | ID of ESG provider | Positive integer |
| ProviderInformationURL | E1 | 0 . . . 1 | Link to other information of ESG provider | Character string |
| PrivateAuxiliaryData | E1 | 0 . . . 1 | Auxiliary data | Character string |
| InteractiveESG | E1 | 1 | Flag bit of interactive ESG or not | Boolean type |
| RelatedESG | E1 | 0 . . . N | Descriptions of related ESG | |
| RelatedProviderID | E2 | 1 | ID of related ESG provider | Positive integer |
| RelationType | E2 | 1 | Relation type, see Table X1 | Integer |
| DataRange | E2 | 0 . . . 1 | Data range | |
| RangeKey | E3 | 0 . . . N | Key for description of data range | Character string |
| KeyDataType | A | 1 | Data type of key | Character string |
| RangeFrom | A | 1 | Starting value of data range | Data type identified with KeyDataType |
| RangeTo | A | 1 | Ending value of data range | Data type identified with KeyDataType |

TABLE 13

| Relation type | Number | Relation type | Number |
|---|---|---|---|
| Accompanying relation | 0x01 | Parallel relation | 0x03 |
| Supplementary relation | 0x02 | Duplicate relation | 0x04 |
| Partial duplicate relation | 0x05 | | |

In Table 14, E indicates an element, A indicates an attribute, E1 indicates a first-layer element, and E2 indicates a sub-element of a first-layer element, and so on.

Further, a relation between the interactive ESG and a related broadcast ESG may also be indicated in the ESG access information, and a specific indication way is to extend ESGAccessDescriptor of the ESG access information by a field which represents a relation between the interactive ESG and the broadcast ESG. A specific representation way is as illustrated in Table 15.

TABLE 15

| Syntax | Length of filed (in bits) | Meaning |
|---|---|---|
| ESGEntry{ | | |
|   ESGEntryVersion | 8 | Version of ESGEntry |
|   ESGEntryLength | 8+ | Length of ESGEntry |
|   MultipleStreamTransport | 1 | Whether multiple stream used or not; |

TABLE 15-continued

| Syntax | Length of filed (in bits) | Meaning |
|---|---|---|
| | | a value of the field is 0 for interactive ESG |
| IPVersion6 | 1 | IPv6 protocol used or not |
| AccessMethod | 1 | 0: Access information of broadcast ESG; 1: Access information of interactive ESG. A value of the field is consistent with that of extended InteractiveESG in ESG discovery information |
| Reserved | 5 | Reserved (originally 6 bits) |
| NumOfRelatedESG | 4 | Number of related ESGs |
| For( i=0; i< NumOfRelatedESG, i++ ){ | | |
|   NumOfRangeKey | 4 | Number of keys for determination of data range |
|   RelatedProviderID | 16 | ID of related ESG provider |
|   RelationType | 4 | Type of relation with related ESG, see Table X1 |
|   for(j=0; j< NumOfRangeKey;j++){ | | |
|     KeyLength | 8 | Length of key name in bits |
|     KeyName | Determined by KeyLength | Key name |
|     ValueFromLength | 8 | Length of starting value of data range in bits |
|     ValueFrom | Determined by ValueFromLength | Starting value of data range |
|     ValueToLength | 8 | Length of ending value of data range in bits |
|     ValueTo | Determined by ValueToLength | Ending value of data range |
|   } | | |
| } | | |
| ProviderID | 16 | Provider ID |
| If( IPVersion6 ){ | | |
|   SourceIPAddress | 128 | Source IP address in IPv6 |
|   DestinationIPAddress | 128 | Destination IP address in IPv6 |
| }else{ | | |
|   SourceIPAddress | 32 | Source IP address in IPv4 |
|   DestinationIPAddress | 32 | Destination IP address in IPv4 |
| } | | |
| if (AccessMethod==0){ | | |
|   Port | 16 | Port number |
|   TSI | 16 | Transport session identity |
| } | | |
| } | | |

In a practical application, it is possible to indicate a relation between the interactive ESG and a related broadcast ESG only in ESG discovery information or ESG access information or to indicate a relation between the interactive ESG and a related broadcast ESG in both the ESG discovery information and the ESG access information.

If the ESG access information is extended by entrance information of the interactive ESG as in either Table 9 or Table 10, a field which indicates a relation between the interactive ESG and a related broadcast ESG may further be added in Table 9 or Table 10, and a specific implementation thereof may be as that for the syntax parts from NumOfRelatedESG to Value To in Table 15.

When a relation between the ESG and the related ESG is indicated in the ESG discovery information or ESG access information, before the terminal submits a data request to the interactive ESG via an interactive channel, the following steps may further be included.

If the terminal determines that the user selects the interactive ESG, the terminal determines the relation between the interactive ESG and the related broadcast ESG according to the discovery information or access information of the interactive ESG. Thereafter, the terminal determines whether the requested data is in the data range of the interactive ESG according to the determined relation between the interactive ESG and the related broadcast ESG. If the requested data is in the data range of the interactive ESG, the terminal sends a data request to the interactive ESG provider; otherwise, the terminal will not send data request to the provider of the interactive ESG and ends the flow.

If the terminal determines that the user selects the broadcast ESG, the terminal determines the relation between the broadcast ESG and the related interactive ESG according to the discovery information or access information of the broadcast ESG and then proceeds as in a broadcast ESG-type specification.

The methods for discovering an interactive ESG according to the embodiments described above firstly obtains the Web Service invocation information of the interactive ESG and then submits a data request to the interactive ESG server according to the interactive ESG service capability information carried in the invocation information to obtain the ESG data. In a practical application, the ESG data may also be obtained directly from the interactive ESG server without firstly obtaining the Web Service invocation information of the interactive ESG. In an ESG multiple stream mechanism, for example, the ESG data may be obtained from direct interaction with the interactive ESG server. In the ESG multiple stream mechanism, the ESG data provided by the ESG service is divided into a plurality of ESG sets for being transported in different sessions.

Division of ESG data provided by an ESG service is described with Partition Declaration information. The terminal obtains ESG bootstrap information from an ESG bootstrap session, and the ESG bootstrap information includes ESG discovery information and ESG access information. The ESG access information includes multiple stream transport identity information and an address for obtaining Partition Declaration information. The terminal obtains the corresponding multiple stream transport identity information from the ESG bootstrap information according to the provider selected by the user, and upon determination of adopting the multiple stream mechanism, the terminal obtains the address for obtaining the Partition Declaration information from the ESG access information of the ESG bootstrap information. In the prior art, a plurality of ESG sets obtained from the division of ESG data that is provided by the ESG service are provided by the broadcast ESG session, and only the address of the broadcast ESG session is carried in the ESG bootstrap session.

The embodiments of the invention extend the ESG multiple stream mechanism in a way that access type information, indicating that an interactive ESG session address or a broadcast ESG session address is carried, is added in the Partition Declaration information for each ESG set. The interactive ESG session address may be an interactive URL.

Figure 14:
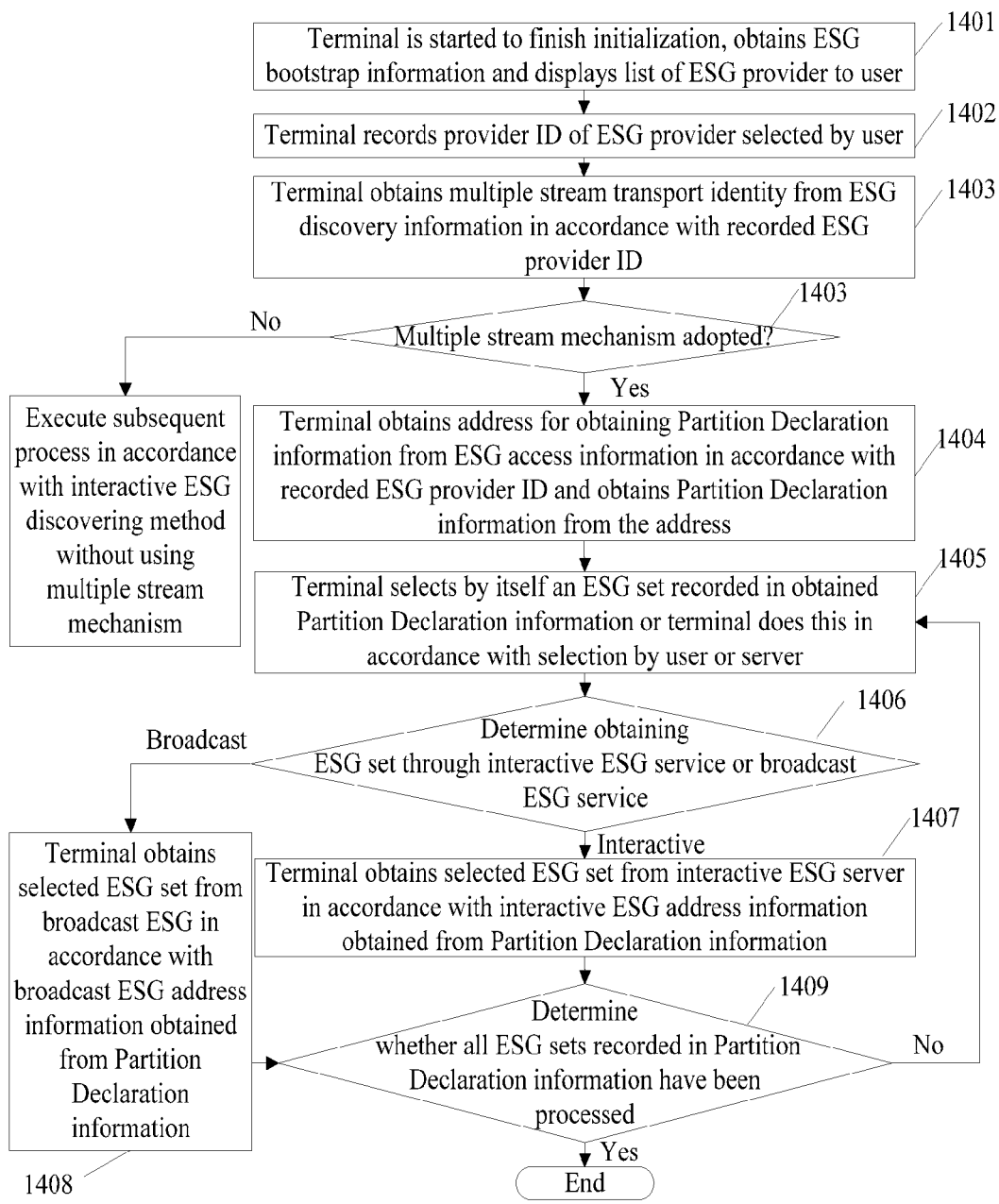
FIG. 14 is a flow chart of a method for discovering an interactive ESG service according to a sixth preferred embodiment of the invention.

FIG. 14 is a flow chart of a method for discovering an ESG service according to a sixth preferred embodiment of the invention, and this flow includes the following steps.

In step 1401, the terminal is started to finish initialization, obtains ESG bootstrap information and displays a list of ESG providers to the user.

Here, the ESG bootstrap session is a broadcast session established over a broadcast network, and the ESG bootstrap session includes ESG discovery information and ESG access information. In this embodiment, the ESG access information includes a multiple stream transport identity indicating whether to adopt an ESG multiple stream mechanism, and an address for obtaining Partition Declaration information. In step 1402, the terminal records the provider ID of an ESG provider selected by the user.

In step 1403, the terminal obtains the multiple stream transport identity from the ESG discovery information according to the recorded ESG provider ID, determine whether to adopt the multiple stream mechanism, and if it is determined to adopt the multiple stream mechanism, the terminal executes step 1404; otherwise the terminal executes a subsequent process via a method for discovering an interactive ESG without using the multiple stream mechanism, for example, the methods for discovering an interactive ESG according to the previous embodiments may be used.

In step 1404, the terminal obtains the address for obtaining the Partition Declaration information from the ESG access information according to the recorded ESG provider ID and obtains the Partition Declaration information from the address.

In step 1405, the terminal selects by itself an ESG set recorded in the obtained Partition Declaration information or the terminal does this in accordance with a selection by the user or the server.

In step 1406, the terminal determines obtaining the ESG set through the interactive ESG service or the broadcast ESG service according to the access type information of the selected ESG set carried in the Partition Declaration information. If the interactive ESG service is determined, the terminal executes step 1407; and if the broadcast ESG service is determined, the terminal executes step 1408.

In step 1407, the terminal obtains the selected ESG set from the interactive ESG server according to the interactive ESG address information obtained from the Partition Declaration information and executes step 1409.

In step 1408, the terminal obtains the selected ESG set from the broadcast ESG according to the broadcast ESG address information obtained from the Partition Declaration information.

In step 1409, the terminal determines whether all the ESG sets recorded in the Partition Declaration information have been processed, and if all the ESG sets recorded in the Partition Declaration information have been processed, the terminal ends the flow; otherwise the terminal returns to step 1406.

Upon reception of each ESG set, the terminal determines whether the received ESG set possesses consistency, and only the ESG set possessing consistency will be parsed and provided to the user by the terminal.

Whether an ESG set possesses consistency is determined complying with the following principle: whether all information referred to by the ESG set is included in the ESG set already obtained by the terminal, and if all information referred to by the ESG set is included in the ESG set already obtained by the terminal, the ESG set is considered to possess consistency and thus may be parsed and provided to the user; otherwise the ESG set is considered possessing no consistency, and the terminal proceeds with receiving a subsequent ESG set until all the information referred to by all the received ESG sets has been received and then the received ESG sets are parsed and provided to the user.

Typically, the terminal determines consistency of an obtained ESG set in a way that the terminal, upon reception of the ESG set, compares feature information of the ESG set with that of a received ESG set, and this procedure may be complex. In order to simplify the procedure in which the terminal determines consistency of a received ESG set, the embodiment of the invention provides the following implementation.

Firstly, when establishing Partition Declaration information, the server determines an order in which ESG sets recorded in the Partition Declaration information will be provided to the terminal and adds a consistency identity for each ESG set. For example, it may be assumed that the consistency identity with a value of 0 indicates that it is not consistent after this ESG set is combined with all previously obtained ESG sets, that is, not all information referred to by this ESG set may be obtained from the previously obtained ESG sets or information referred to by the previously obtained ESG sets may not be obtained from this ESG; and the consistency identity with a value of 1 indicates that this ESG set is in consistency with a union of all ESG sets obtained previously, that is, information referred to by this ESG and that by all the previously obtained ESG sets may be obtained from the currently obtained ESG set.

Before obtaining an ESG set recorded in the Partition Declaration information selected by the terminal, the terminal shall obtain all the ESG sets before this ESG set in the order as determined by the server. Upon obtaining an ESG set, the terminal firstly determines consistency of the ESG set according to the consistency identity of the ESG set.

If the consistency identity is with a value of 1, the terminal obtains the ESG set, parses this ESG set along with the previously obtained ESG sets which have not been provided to the user and exhibits them to the user.

If the consistency identity is with a value of 0, the terminal executes no processing after obtaining the ESG set and proceeds with obtaining the next ESG set.

The invention further provides a system for discovering an interactive electronic service guide service, and this system includes a server and a terminal. The server includes a module for sending information related to discovering of the interactive ESG service and a module for issuing a list of ESG providers.

The module for sending information related to discovering of the interactive ESG service is adapted to issue information of ESG providers which is related to discovering of the interactive ESG service to a terminal via a broadcast channel.

The module for issuing a list of ESG providers issues a list of ESG providers to the terminal in an ESG bootstrap session via the broadcast channel.

The terminal includes: a module for receiving information related to discovering of the interactive ESG service and a module for receiving a list of ESG providers.

The module for receiving a list of ESG providers is adapted to obtain the list of ESG providers from the broadcast channel, to display the list to a user and to record an ESG provider selected by the user.

The module for receiving information related to discovering of the interactive ESG service is adapted to obtain the corresponding information related to discovering of the interactive ESG service from the broadcast channel according to the ESG provider selected by the user.

Figure 15:
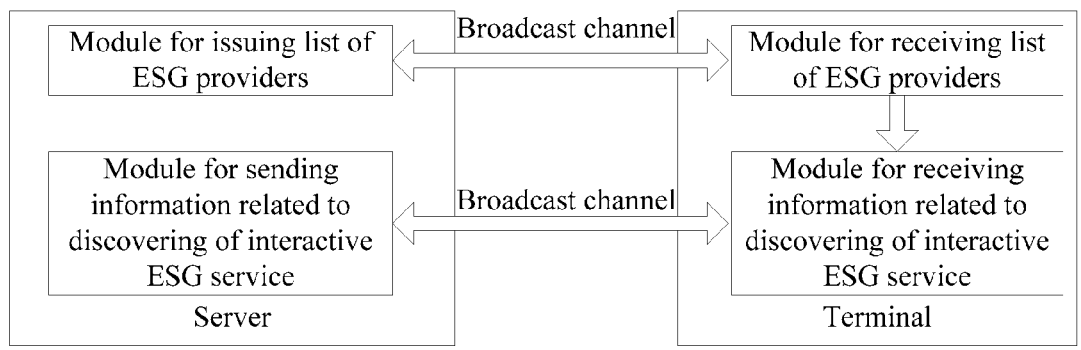
FIG. 15 is a schematic diagram of a structure of a system for discovering an interactive ESG service according to an embodiment of the invention.

FIG. 15 is a schematic diagram of a structure of the system for discovering an interactive ESG service according to an embodiment of the invention, and the server of the system includes a module for sending information related to discovering of the interactive ESG service and a module for issuing a list of ESG providers.

The terminal of the system includes a module for receiving information related to discovering of the interactive ESG service and a module for receiving a list of ESG providers.

The information related to discovering of the interactive ESG service may be Web Service invocation information of the interactive ESG service.

In this case, the module for sending information related to discovering of the interactive ESG service is adapted to send the Web Service invocation information of interactive ESG services of ESG providers to the module for receiving information related to discovering of the interactive ESG service in the terminal via a broadcast channel.

The module for receiving information related to discovering of the interactive ESG service in the terminal is adapted to obtain the Web Service invocation information of the interactive ESG service of a corresponding ESG provider via the broadcast channel according to the ESG provider selected by the user.

The server may further include: a module for constructing index information, adapted to construct a transport object of the Web Service invocation information and index information of an ESG provider, to add an index information identity in an attribute which describes the transport object carrying the index information and to send the constructed index information to the module for sending information related to discovering of the interactive ESG service.

The module for sending information related to discovering of the interactive ESG service is further adapted to issue the index information to the terminal via the broadcast channel.

The terminal further includes: a module for receiving index information, adapted to obtain the index information in a transport session. The module for receiving information related to discovering of the interactive ESG service in the terminal is adapted to obtain the corresponding Web Service invocation information from the transport session in accordance with the index information.

The server may further include: a module for sending transport session entrance information, adapted to store in the ESG discovery information or ESG access information of the ESG providers the entrance information of a transport session where the Web Service invocation information of the interactive ESG is located and to issue it to the terminal.

The terminal further includes: a module for receiving ESG transport session entrance information, adapted to obtain the entrance information of the transport session from the ESG discovery information or access information via the broadcast channel in accordance with the ESG provider selected by the user.

The module for receiving information related to discovering of the interactive ESG service obtains the Web Service invocation information of the interactive ESG via the broadcast channel in accordance with the entrance information of the transport session.

The module for sending information related to discovering of the interactive ESG service in the server may also issue the ESG discovery information in which the Web Service invocation information of the interactive ESG is stored to the module for receiving information related to discovering of the interactive ESG service in the terminal in an ESG bootstrap session via the broadcast channel.

The server may further include: a module for constructing index information, adapted to construct a transport object of the Web Service invocation information and index information of corresponding ESG provider, to add an index information identity in an attribute which describes the transport object carrying the index information and to send the constructed index information to the module for sending information related to discovering of the interactive ESG service.

The module for sending information related to discovering of the interactive ESG service is further adapted to issue the index information to the terminal via the broadcast channel.

The server further includes: a module for constructing a container, adapted to encapsulate the Web Service invocation information in a container and to send the container to the module for sending information related to discovering of the interactive ESG service.

The module for sending information related to discovering of the interactive ESG service is adapted to issue the received container to the terminal via the broadcast channel.

The server further includes: a module for constructing container index information, adapted to construct a number of the container in which the Web Service invocation information is encapsulated, a number of a sub-structure included in the container and index information of basic information of an ESG provider, to add an index information identity in a container in which the index information is encapsulated and to send the constructed index information to the module for constructing a container.

The module for constructing a container is further adapted to encapsulate the received index information in a separate container and to issue the container to the module for sending information related to discovering of the interactive ESG service.

The module for sending information related to discovering of the interactive ESG service is adapted to issue the received container to the terminal via the broadcast channel.

The information related to discovering of the interactive ESG service may also be entrance information of the interactive ESG, and in this case, the module for sending information related to discovering of the interactive ESG service is adapted to store the entrance information of the interactive ESG in the discovery information or access information of a corresponding ESG provider and to issue it to the terminal via the broadcast channel.

The module for receiving information related to discovering of the interactive ESG service is adapted to obtain the entrance information of the interactive ESG from the discovery information or the access information of the ESG provider via the broadcast channel.

The terminal further includes a module for obtaining Web Service invocation information adapted to obtain the entrance information of the interactive ESG from the module for receiving information related to discovering of the interactive ESG service and to obtain corresponding Web Service invocation information from an interactive channel in accordance with the obtained entrance information of the interactive ESG.

Information of a relation between the ESG and a related ESG may further be added into the ESG discovery information or access information issued from the ESG bootstrap session module to the terminal. Specifically, a field which describes a relation between the interactive ESG and a related broadcast ESG is added in the discovery information or access information of the interactive ESG; and a field which describes a relation between a broadcast ESG and a related interactive ESG is added in the discovery information or access information of the broadcast ESG.

The terminal may further include: a module for determining a relation between a broadcast ESG and an interactive ESG, adapted to determine a relation between the interactive ESG and the related broadcast ESG in accordance with the ESG access information or discovery information obtained from the ESG bootstrap session.

If the user selects the interactive ESG, the terminal may further include: a module for requesting data, adapted to submit, according to the interactive ESG selected by the user, a data request to an interactive ESG provider when determining that data as requested by the data request to be sent to the interactive ESG provider is within a data range of the interactive ESG according to the relation between the interactive ESG and the related broadcast ESG.

In the embodiment of the invention, the information related to discovering of the interactive ESG service may also be an address for obtaining Partition Declaration information.

In this case, the module for sending information related to discovering of the interactive ESG service in the server is adapted to issue the address for obtaining the Partition Declaration information to the terminal via the broadcast channel. The module for receiving information related to discovering of the interactive ESG service in the terminal is adapted to obtain the corresponding address for obtaining the Partition Declaration information via the broadcast channel in accordance with the ESG provider selected by the user.

The module for sending information related to discovering of the interactive ESG service in the server may consist of a module for creating a Partition Declaration and a module for sending a Partition Declaration.

The module for creating a Partition Declaration is adapted to create the Partition Declaration information of ESG data provided by each ESG provider.

The module for sending a Partition Declaration is adapted to include the created Partition Declaration information in the ESG access information and to issue it to the terminal.

Specifically, the Partition Declaration information includes an address for obtaining each ESG set, information on access type of the address and a consistency identity of the ESG set. The module for creating a Partition Declaration may consist of a module for determining an ESG set and a module for determining a consistency identity.

The module for determining an ESG set is adapted to divide the ESG data provided by each ESG service into a plurality of ESG sets and to determine the address for obtaining each ESG set and the access type of the address.

The module for determining a consistency identity is adapted to determine consistency of each ESG set in accordance with an order in which the plurality of ESG sets are provided to the terminal.

The terminal may further include:
a module for obtaining a Partition Declaration, adapted to obtain the Partition Declaration information from the address for obtaining the Partition Declaration information obtained by the module for receiving information related to discovering of the interactive ESG service;
a module for obtaining an ESG set, adapted to obtain each ESG set recorded in the Partition Declaration information sequentially according to the information of the address for obtaining the ESG set carried in the Partition Declaration information.

In order to simplify a procedure in which the terminal determines consistency of an ESG set, the terminal may further include:
a module for determining consistency of an ESG set, adapted to determine whether an ESG set obtained by the module for obtaining an ESG set possesses consistency in accordance with the consistency identity of the ESG set carried in the obtained Partition Declaration information;
a module for providing ESG data, adapted to parse an ESG set possessing consistency or a union of the ESG set possessing consistency and ESG sets previously obtained by the module for obtaining an ESG set but not provided to the user and to provide it to the user.

As may be seen from the above descriptions of the embodiments, in the embodiments of the invention, the server issues information related to discovering of the interactive ESG service to the terminal via a broadcast channel, and the terminal obtains the information for discovering the interactive ESG service from the broadcast channel, thereby eliminating the need of the terminal submitting an enquiry request to the interactive ESG service enquiry server and thus reducing effectively the load of an interactive channel and improving the efficiency of using the interactive channel. Further, it is not necessary for the provider to provide an interactive ESG service enquiry server, thus saving the operation cost.

Further, the method for discovering an interactive ESG according to the embodiments of the invention may also be applied in an ESG multiple stream mechanism, and a consistency identity for each ESG set is added in Partition Declaration information, thereby further simplifying a procedure in which the terminal determines consistency of an obtained ESG set.

In summary, the foregoing descriptions are merely illustrative of the preferred embodiments of the invention and are not intended to limit the scope of the invention. Any modifications, equivalent alternatives or adaptations made without departing from the spirit of the invention shall fall within the scope of the invention.

What is claimed is:

1. A method for discovering an interactive Electronic Service Guide (ESG) using a terminal of a mobile communication network, comprising:
obtaining, by the terminal from a server in an ESG bootstrap session via a broadcast channel, a list of available ESG providers, and selecting an ESG provider from the list of available ESG providers;

obtaining, by the terminal from the server in the ESG bootstrap session via the broadcast channel, discovery information of the selected ESG provider;

wherein the discovery information includes entrance information for accessing an interactive ESG provided by the selected ESG provider via a link separate from the broadcast channel, and wherein the entrance information includes a Uniform Resource Locator (URL) of a web service through which the interactive ESG is provided via the separate link.

2. The method according to claim 1, further comprising:

determining that the server stores the entrance information of the interactive ESG in the discovery information and entrance information of a broadcast ESG is also stored in the ESG discovery information, and adding in the discovery information an interactive ESG identity which distinguishes the entrance information of the broadcast ESG from the entrance information of the interactive ESG.

3. A server, comprising a module for sending information related to discovering of an interactive Electronic Service Guide (ESG) service and a module for issuing a list of ESG providers, wherein:

the module for sending information related to discovering the interactive ESG service is configured to issue discovery information of ESG providers which is related to discovering the interactive ESG service to a terminal via a broadcast channel; and the module for issuing a list of ESG providers is configured to issue, in an ESG bootstrap session via the broadcast channel, a list of available ESG providers to the terminal wherein the discovery information includes entrance information for accessing an interactive ESG provided by a selected ESG provider via a link separate from the broadcast channel, and wherein the entrance information includes a Uniform Resource Locator (URL) of a web service through which the interactive ESG is provided via the separate link.

4. A terminal, comprising: a module for receiving information related to discovering an interactive Electronic Service Guide (ESG) service and a module for receiving a list of ESG providers, wherein:

the module for receiving a list of ESG providers is configured to obtain, from a server in an ESG bootstrap session via a broadcast channel, a list of available ESG providers, to display the list to a user and to record an ESG provider selected by the user; and the module for receiving information related to discovering the interactive ESG service is configured to obtain, from the server in the ESG bootstrap session via the broadcast channel, corresponding discovery information of the selected ESG provider, which is related to discovering the interactive ESG service;

wherein the discovery information includes entrance information for accessing an interactive ESG provided by the selected ESG provider via a link separate from the broadcast channel, and wherein the entrance information includes a Uniform Resource Locator (URL) of a web service through which the interactive ESG is provided via the separate link.

5. The terminal according to claim 4, further comprising: a module configured to determine a relation between the interactive ESG and a related broadcast ESG in accordance with the discovery information.

* * * * *